US011891043B2

(12) United States Patent
Ito et al.

(10) Patent No.: US 11,891,043 B2
(45) Date of Patent: Feb. 6, 2024

(54) CONTROL SYSTEM

(71) Applicant: DENSO CORPORATION, Kariya (JP)

(72) Inventors: Yutaro Ito, Kariya (JP); Mitsuharu Higashitani, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/671,774

(22) Filed: Feb. 15, 2022

(65) Prior Publication Data
US 2022/0258713 A1 Aug. 18, 2022

(30) Foreign Application Priority Data
Feb. 15, 2021 (JP) ................................. 2021-021705

(51) Int. Cl.
*B60W 10/26* (2006.01)
*B60R 16/033* (2006.01)
(Continued)

(52) U.S. Cl.
CPC ........... *B60W 10/26* (2013.01); *B60R 16/023* (2013.01); *B60R 16/033* (2013.01); *B60W 20/00* (2013.01); *B60W 2510/242* (2013.01)

(58) Field of Classification Search
CPC ................. B60W 10/26; B60W 20/00; B60W 2510/242; B60W 2556/50;
(Continued)

(56) References Cited

U.S. PATENT DOCUMENTS

| 2008/0294301 A1 | 11/2008 | Kaigawa et al. | |
| 2013/0184901 A1* | 7/2013 | Wall | B60W 50/0097 701/3 |
| 2017/0247927 A1* | 8/2017 | Elie | E05F 15/611 |

FOREIGN PATENT DOCUMENTS

| JP | 2002-036903 A | 2/2002 |
| JP | 2002036903 A * | 2/2002 |

(Continued)

OTHER PUBLICATIONS

U.S. Appl. No. 17/672,112, filed Feb. 15, 2022 in the name of Shigyo et al.
(Continued)

*Primary Examiner* — Yi-Kai Wang
(74) *Attorney, Agent, or Firm* — Oliff PLC

(57) ABSTRACT

A control system includes: a plurality of sub-power managers that control respective output power of a plurality of subsystems that actualize functions of the vehicle; and an integrated power manager that performs integrated control of output power in the overall vehicle by exchanging information with the plurality of sub-power managers. The information that is exchanged between the plurality of sub-power managers and the integrated power manager includes information that enables calculation of a physical quantity that is expressed by at least either of a power dimension and an energy dimension. The plurality of subsystems respectively corresponds to a plurality of domains that each include one or more apparatuses and a storage unit. The integrated power manager plans a stored energy quantity of the storage unit in each of the domains that respectively correspond to the plurality of sub-power managers.

8 Claims, 14 Drawing Sheets

(51) Int. Cl.
*B60R 16/023* (2006.01)
*B60W 20/00* (2016.01)

(58) Field of Classification Search
CPC ......... B60W 2556/55; B60W 2556/65; B60W 10/06; B60W 10/08; B60W 10/10; B60W 10/18; B60W 10/30; B60W 20/11; B60W 20/12; B60W 20/14; B60W 20/16; B60W 50/0097; B60R 16/023; B60R 16/033; B60K 6/48
USPC .......................................................... 701/22
See application file for complete search history.

(56) References Cited

FOREIGN PATENT DOCUMENTS

| JP | 4058538 B2 | 3/2008 |
| JP | 6080234 B1 | 2/2017 |
| JP | 2021-002940 A | 1/2021 |

OTHER PUBLICATIONS

U.S. Appl. No. 17/672,052, filed Feb. 15, 2022 in the name of Higashitani et al.

* cited by examiner

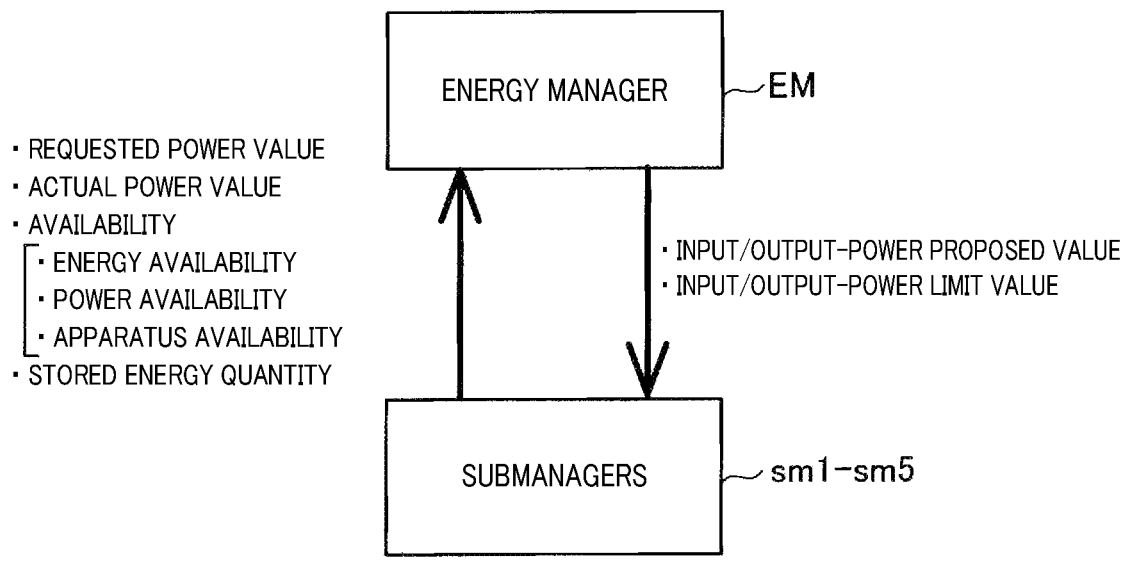
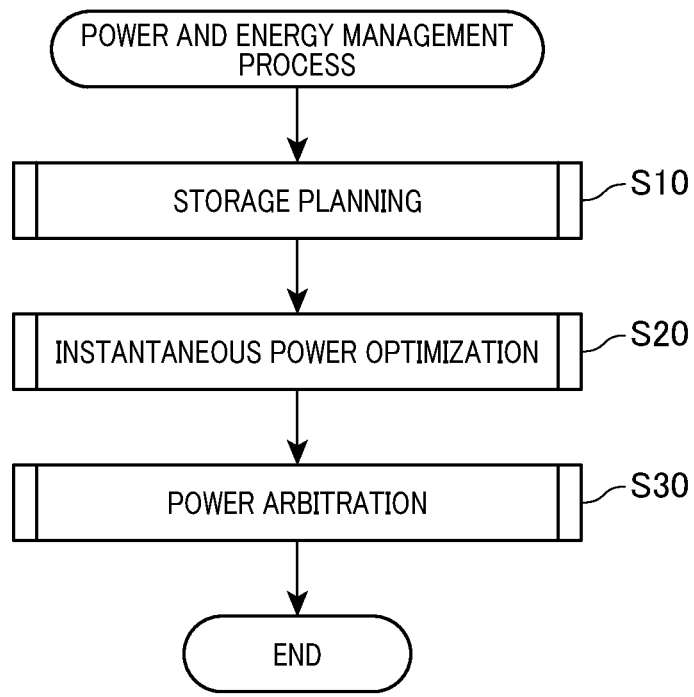

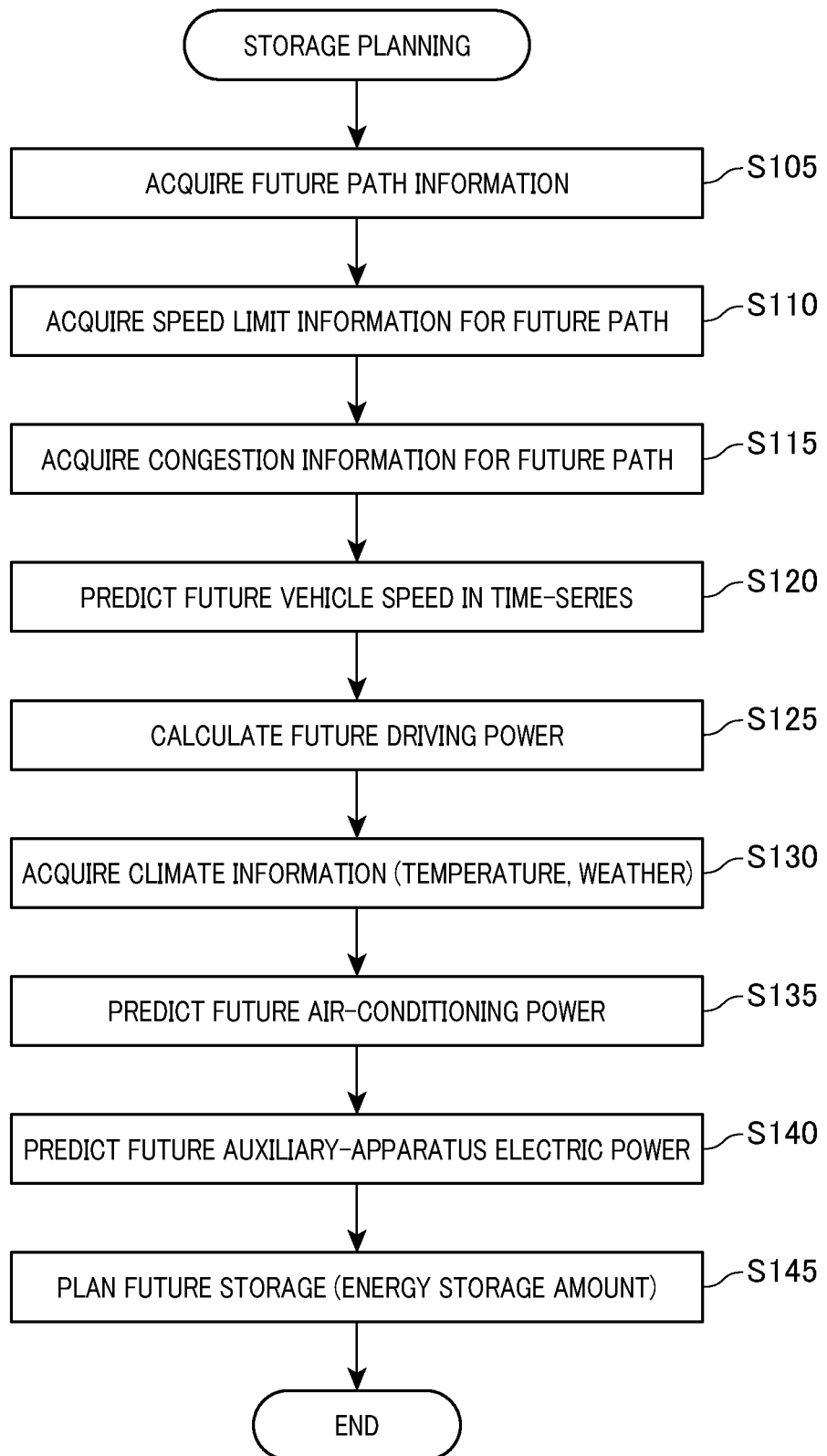

[BEFORE SYSTEM RENEWAL]

| PRESENCE/ABSENCE | APPARATUS/SUBSYSTEM |
|---|---|
| 1 | MG TYPE 1 |
| 0 | MG TYPE 2 |
| 1 | INVERTER |
| 1 | ELECTRIC HEATER 1 |
| 0 | ELECTRIC HEATER 2 |

Ls1

[AFTER SYSTEM RENEWAL]

| | IN | | | | OUT | | | | | EFFICIENCY | MAXIMUM/ MINIMUM OUTPUT |
|---|---|---|---|---|---|---|---|---|---|---|---|
| | MOVEMENT | BATT | AUXILIARY APPARATUS | ... | AIR-CONDITIONING | MOVEMENT | BATT | AUXILIARY APPARATUS | COOLING WATER | ... | |
| MG | | 1 | | | | 1 | | | 1 | | SCALAR/ MAP | SCALAR/ MAP |
| INV | | 1 | | | | | 1 | | 1 | | SCALAR/ MAP | SCALAR/ MAP |
| ELECTRIC HEATER 1 | | 1 | | | | | | | 1 | | SCALAR/ MAP | SCALAR/ MAP |
| ELECTRIC HEATER 2 | | | 1 | | | | | | 1 | | SCALAR/ MAP | SCALAR/ MAP |
| ... | | | | | | | | | | | SCALAR/ MAP | SCALAR/ MAP |
| | ⋮ | ⋮ | ⋮ | ⋮ | ⋮ | ⋮ | | | | | | |

CONTROL SYSTEM

CROSS-REFERENCE TO RELATED APPLICATIONS

This application is based on and claims the benefit of priority from Japanese Patent Application No. 2021-021705, filed Feb. 15, 2021. The entire disclosure of the above application is incorporated herein by reference.

BACKGROUND

Technical Field

The present disclosure relates to a control system that controls power supply in a vehicle.

Related Art

Various control systems that plan traveling of a vehicle from a perspective of energy have been proposed. For example, a control system identifies a traveling pattern by which a vehicle travels a unit traveling section using minimum energy (minimum electric power) that is stored in a storage apparatus, and controls driving of an engine such that the traveling pattern is actualized.

SUMMARY

An aspect of the present disclosure provides a control system that includes: a plurality of sub-power managers that control respective output power of a plurality of subsystems that actualize functions of the vehicle; and an integrated power manager that performs integrated control of output power in the overall vehicle by exchanging information with the plurality of sub-power managers. The information that is exchanged between the plurality of sub-power managers and the integrated power manager includes information that enables calculation of a physical quantity that is expressed by at least either of a power dimension and an energy dimension. The plurality of subsystems respectively corresponds to a plurality of domains that each include one or more apparatuses and a storage unit. The integrated power manager plans a stored energy quantity of the storage unit in each of the domains that respectively correspond to the plurality of sub-power managers.

BRIEF DESCRIPTION OF THE DRAWINGS

In the accompanying drawings:

FIG. 3 is an explanatory diagram illustrating information that is exchanged between an energy manager and submanagers;

FIG. 4 is a flowchart illustrating steps in a power and energy management process;

FIG. 5 is a flowchart illustrating steps in a storage planning process;

FIG. 17 is an explanatory diagram illustrating an example of the apparatus list in a variation example according to the fifth embodiment.

DESCRIPTION OF THE EMBODIMENTS

Figure 1:
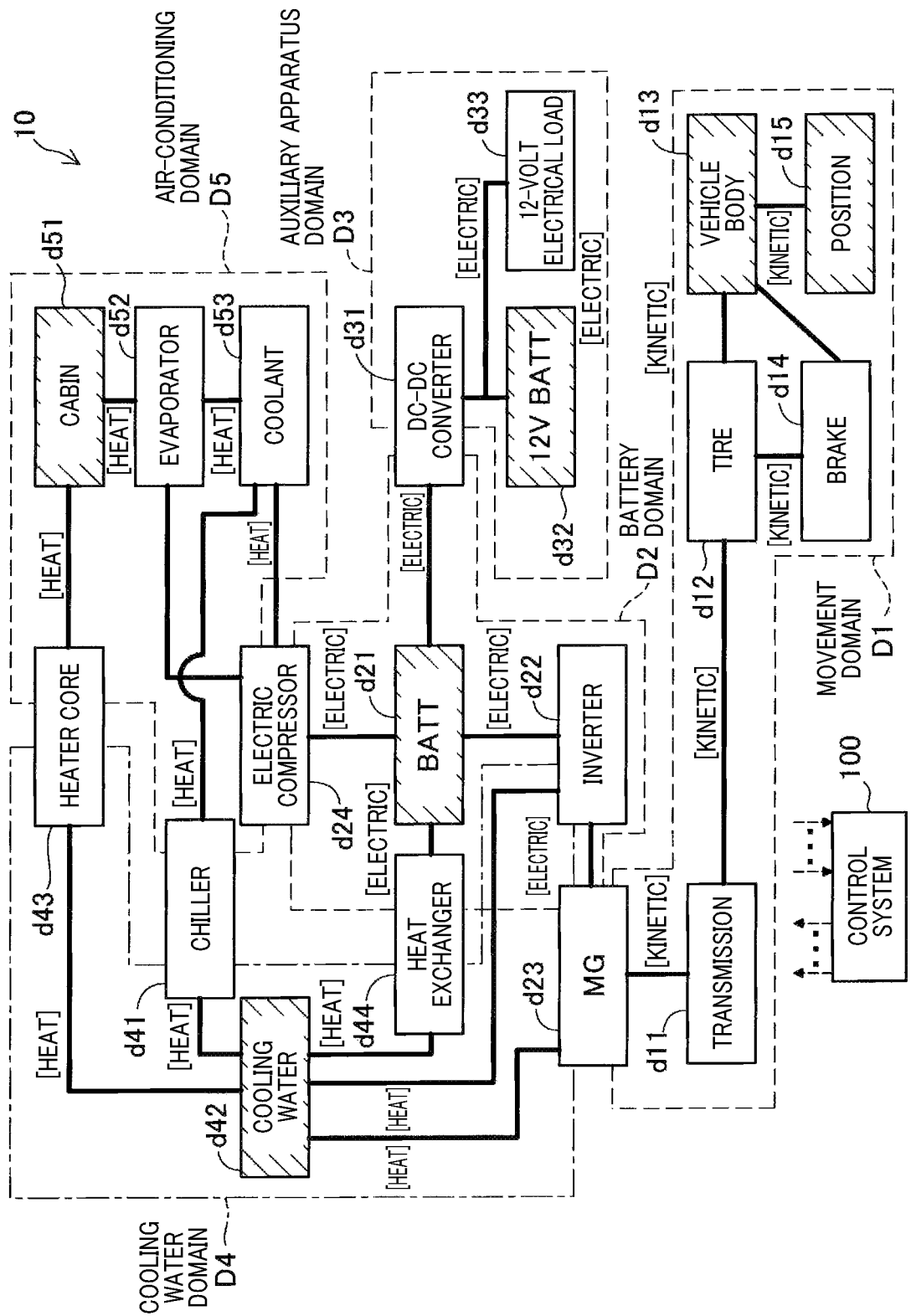
FIG. 1 is a block diagram schematically illustrating a configuration of a vehicle in which a control system according to an embodiment of the present disclosure is mounted.

Various control systems that plan traveling of a vehicle from a perspective of energy have been proposed. For example, as in an engine/motor driving control unit in Japanese Patent Publication No. 6080234, a control system that identifies a traveling pattern by which a vehicle travels a unit traveling section using minimum energy (minimum electric power) that is stored in a storage apparatus, and controls driving of an engine such that the traveling pattern is actualized has been proposed.

In general, not only electric power, but also various types (modes) of energy such as kinetic energy, heat energy, and chemical energy (energy that accompanies combustion of fuel) are used in a vehicle. However, in actuality, energy planning across these plurality of types of energy has not been examined. Therefore, a technology that enables planning of energy quantities across a plurality of types of energy is desired.

An exemplary embodiment of the present disclosure provides a control system that controls power supply in a vehicle is provided. The control system includes: a plurality of sub-power managers that control respective output power of a plurality of subsystems that actualize functions of the vehicle; and an integrated power manager that performs integrated control of output power in the overall vehicle by exchanging information with the plurality of sub-power managers. The information that is exchanged between the plurality of sub-power managers and the integrated power manager is information that enables calculation of a physical quantity that is expressed by at least either of a power dimension and an energy dimension. The plurality of subsystems respectively corresponds to a plurality of domains that each include one or more apparatuses that are mounted in the vehicle and a storage unit that performs input and output of energy of a type that is prescribed in advance to and from the one or more apparatuses. The integrated power manager plans a stored energy quantity of the storage unit in each of the domains that respectively correspond to the plurality of sub-power managers.

As a result of the control system according to this exemplary embodiment, the integrated power manager performs integrated control of output power in the overall vehicle by exchanging information with the sub-power managers of the plurality of subsystems that respectively correspond to the plurality of domains that each include one or more apparatuses that are mounted in the vehicle and a storage unit that performs input and output of energy of a type that is prescribed in advance to and from the one or more apparatuses, and plans the stored energy quantity of the storage unit in each domain. Consequently, even in a configuration in which the storage units of the domains input and output a plurality of types of energy that differ from one another, energy quantities can be planned across the plurality of types of energy that are stored in the storage units of the domains.

A. First Embodiment

A1. System Configuration

A control system 100 according to an embodiment of the present disclosure is used so as to be mounted in a vehicle 10 shown in FIG. 1. The control system 100 controls power supply in the vehicle 10. First, the vehicle 10 will be described.

According to the present embodiment, the vehicle 10 is an electric vehicle (a so-called "EV"). In the vehicle 10, a motor generator d23 is driven by electric power that is stored in a battery d21. Driving force that is outputted from the motor generator d23 is transmitted to a tire d12 through a transmission d11. The vehicle 10 can thereby be propelled.

The control system 100 according to the present embodiment manages constituent elements that configure the vehicle 10 by dividing the constituent elements into a plurality of domains. The domain refers to a subject area over which a submanager manages energy. The submanagers (submanagers sm1 to sm5) will be described hereafter. In addition, the domain is a concept that includes an apparatus group among which a same type of energy is inputted and outputted and an energy medium thereof. Each domain includes one or more apparatuses, and a storage unit that inputs and outputs energy of a type that is prescribed in advance to and from the one or more apparatuses. As shown in FIG. 1, a total of five domains are set in the vehicle 10. Specifically, a movement domain D1, a battery domain D2, an auxiliary apparatus domain D3, a cooling water domain D4, and an air-conditioning domain D5 are set.

The movement domain D1 includes an apparatus group among which kinetic energy is inputted and outputted, and a storage unit. Here, the above-described kinetic energy may include positional energy described hereafter. Specifically, the movement domain D1 includes the transmission d11, the tire d12, a vehicle body d13, a brake d14, a position d15, and the motor generator d23.

The transmission d11 converts the driving force that is outputted from the motor generator d23 to torque or rotation frequency, and transfers the torque or rotation frequency to the tire d12 through a shaft. The tire d12 moves the vehicle body d13 forward and backward by frictional force between the tire d12 and a road surface. The vehicle body d13 includes various members such as a chassis, a side member, and a cross member. The brake d14 generates braking force as a result of an actuator (not shown) controlling rotation of a friction brake. That is, the brake d14 converts kinetic energy that is stored in the vehicle body d13 to frictional heat and the like in the tire d12. The position d15 refers to a position of the vehicle 10.

According to the present embodiment, the position refers to a source of positional energy, that is, a position in a height direction, or in other words, elevation of the vehicle 10. The vehicle body d13 and the position d15 that are shaded by hatching in the movement domain D1 perform input and output of energy, and correspond to the "storage unit" described above. The vehicle body d13 stores kinetic energy in a moving state and loses kinetic energy during deceleration. The position d15 stores more energy at a higher position. The motor generator d23 is also included in the battery domain D2 described hereafter. Therefore, details of the motor generator d23 will be described hereafter.

The battery domain D2 includes an apparatus group among which electrical energy is inputted and outputted, and a storage unit. Specifically, the battery domain D2 includes the battery d21, an inverter d22, the motor generator d23, an electric compressor d24, and a direct current-to-direct current (DC-DC) converter d31. For example, the battery d21 is capable of outputting a high voltage of about 300 volt. The inverter d22 converts a direct current that is outputted from the battery d21 to an alternating current and supplies the alternating current to the motor generator d23. In addition, conversely, the inverter d22 converts a regenerative current that is an alternating current that is generated in the motor generator d23 to a direct current and supplies the direct current to the battery d21. The inverter d22 generates heat as a result of operation.

According to the present embodiment, this heat is provided to a cooling water d42 described hereafter. Therefore, the inverter d22 is included in the battery domain D2 and the cooling water domain D4 described hereafter. The motor generator d23 rotates as a result of electric power that is supplied from the inverter d22. In addition, the motor generator d23 converts rotation (kinetic energy) that is inputted from the transmission d11 to electric power (electrical energy). As describe above, the motor generator d23 converts electrical energy to kinetic energy and kinetic energy to electrical energy. In addition, the motor generator d23 generates heat as a result of the rotation operation thereof.

According to the present embodiment, in a manner similar to the inverter d22, the heat that is generated in the motor generator d23 is provided to the cooling water d42 described hereafter. Therefore, the motor generator d23 is included in the battery domain D2 and the cooling water domain D4 described hereafter. The electric compressor d24 is driven by receiving electric power that is supplied from the battery d21 and compresses a coolant (a coolant d53 described hereafter) in a refrigerating cycle. As a result, heat is provided to the coolant d53. Therefore, the electric compressor d24 is included in the battery domain D2 and the air-conditioning domain D5 described hereafter. The DC-DC converter d31 will be described hereafter.

In the battery domain D2, the battery d21 corresponds to the "storage unit." In addition, Joule heat is generated inside the battery d21 as a result of input and output of electric power. Therefore, the battery d21 may be added as new heat-energy storage. The Joule heat that is generated in the battery d21 is provided to the cooling water d42 for cooling the battery d21.

The auxiliary machine domain D3 includes an apparatus group among which electrical energy is inputted and outputted, and a storage unit. Specifically, the auxiliary machine domain D3 includes the DC-DC converter d31, a 12-volt battery d32, and a 12-volt electrical load. The DC-DC converter d31 is connected to the battery d21 and converts high-voltage power that is supplied from the battery d21 to a low-voltage power of 12 volt.

The 12-volt battery 32 is connected to the DC-DC converter d31 and stores electric power by the electric power that is supplied from the DC-DC converter d31. In addition, the 12-volt battery d32 is capable of discharging electric power and supplies 12 volt power to the 12-volt electrical load d33. The 12-volt electrical load d33 operates by receiving a supply of electric power through the DC-DC converter d31 or a supply of electric power from the 12-volt battery d32.

For example, as the 12-volt electrical load d33, in addition to lighting apparatuses such as an interior light and headlights, a navigation apparatus 201, a global positioning system (GPS) apparatus 202, a communication module that is provided in an external communication unit 210, and a user interface unit 220 that includes a touch panel and the like, described hereafter, are applicable. In the auxiliary apparatus domain D3, the 12-volt battery d32 corresponds to a "storage unit."

The cooling water domain D4 includes an apparatus group among which heat energy is inputted and outputted, and a storage unit. Specifically, the cooling water domain D4 includes a chiller d41, the cooling water d42, a heater core d43, a heat exchanger d44, and the above-described motor generator d23 and inverter d22. The chiller d41 cools the cooling water d42 by performing heat exchange between the battery d21 and the cooling water d42. The cooling water d42 transfers heat among the chiller d41, the heater core d43, the heat exchanger d44, the inverter d22, the motor generator d23, and a radiator (not shown).

As described above, the inverter d22 and the motor generator d23 generate heat as a result of operation. This heat is absorbed by the cooling water d42 and the cooling water d42 is cooled by the chiller d41 or the radiator (not shown). As a result, the battery d21, the inverter d22, and the motor generator d23 are cooled. Malfunctions in the battery d21, the inverter d22, and the motor generator d23 due to heat generation are suppressed. In addition, the cooling water d42 heats a cabin d51 through the heater core d43. In the cooling water domain D4, the cooling water d42 corresponds to the "storage unit."

The air-conditioning domain D5 includes an apparatus group among which heat energy is inputted and outputted, and a storage unit for air-conditioning. Specifically, the air-conditioning domain D5 includes the cabin d51, an evaporator d52, the coolant d53, and the above-described electric compressor d24 and heater core d43.

The cabin d51 is cooled by the refrigerating cycle. Here, the cabin d51 may be warmed by an interior condenser (not shown). The evaporator d52 cools the cabin d51 by removing latent heat from the cabin d51 by the atomized coolant d53 that has low temperature and low pressure as a result of being passed through the interior condenser, an exterior condenser, a receiver, and an expansion valve (not shown) that configure the refrigerating cycle. The evaporator d52 also sends the vaporized coolant d53 to the electric compressor d24. In the air-conditioning domain D5, the cabin d51 corresponds to the "storage unit."

The control system 100 is electrically connected to the apparatuses that are included in the domains and various sensors that are used to ascertain operation states of the apparatuses in the domains. The control system 100 is configured to be communicate with the apparatuses and acquire detection results of the sensors. For example, as the various sensors, in the movement domain D1, a sensor that detects an amount of depression of an accelerator pedal, a sensor that detects a vehicle speed, a sensor that detects a rotation frequency of the motor generator d23, a sensor that detects a position (elevation) of the vehicle 10, and the like are applicable.

In the battery domain D2, a sensor that detects a state-of-charge (SOC) of the battery d21, a sensor that detects a current that is supplied to the motor generator d23, and the like are applicable. In the auxiliary apparatus domain D3, a sensor that detects a SOC of the 12-volt battery d32, a sensor that measures a current that is supplied to each electrical load, and the like are applicable. In the cooling water domain D4, a sensor that detects a temperature of the cooling water d42 and the like are applicable. In the air-conditioning domain D5, a sensor that detects a temperature inside the cabin d51, a sensor that detects a rotation frequency of the electric compressor d24, and the like are applicable.

Figure 2:
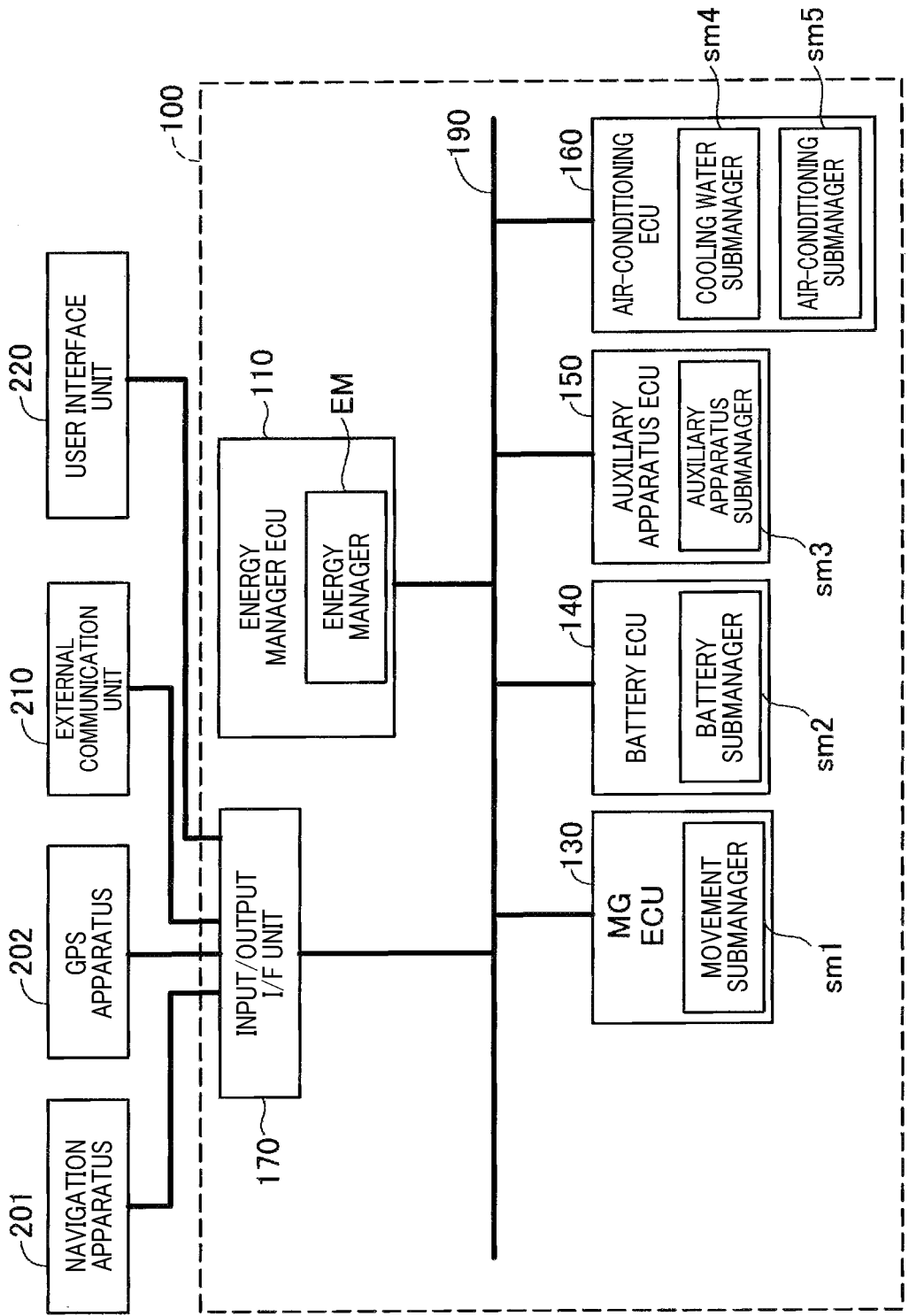
FIG. 2 is a block diagram illustrating a configuration of the control system.

As shown in FIG. 2, the control system 100 includes a plurality of electronic control units (ECUs) and an input/output interface unit 170 that are connected to one another over a controller area network (CAN) 190. The input/output interface unit 170 provides an interface to enable the plurality of ECUs to exchange data with the navigation apparatus 201, the GPS apparatus 202, and the external communication unit 210 over the CAN. The plurality of ECUs refers to an energy manager ECU 110, a motor generator ECU 130, a battery ECU 140, an auxiliary machine ECU 150, an air-conditioning ECU 160.

The energy manager ECU 110 includes an energy manager EM as a functional unit. That is, a central processing unit (CPU) that is provided in the energy manager ECU 110 functions as the energy manager EM by running a control program that is stored in a memory that is provided in the energy manager ECU 110. The energy manager EM performs integrated control of output power in the overall vehicle 10 by exchanging information with a plurality of submanagers sm1 to sm5 described hereafter. The energy manager EM is also referred to as an "integrated power manager." The energy manager EM performs a power and energy management process described hereafter and exchanges information with the plurality of submanagers sm1 to sm5 in this process.

Details of the information will be described hereafter. The plurality of submanagers sm1 to sm5 control output power in a plurality of subsystems that actualize functions of the vehicle 10. The submanager is also referred to as a "sub-power manager." According to the present embodiment, the "plurality of subsystems" corresponds to the five domains D1 to D5 described above. Details of the submanagers sm1 to sm5 will be described hereafter.

The motor generator ECU 130 controls operation of the motor generator d23. The motor generator d23 includes the movement submanager sm1 as a functional unit. The movement submanager sm1 controls output power in a subsystem that corresponds to the movement domain D1 and actualizes traveling, braking, and the like of the vehicle 10. According to the present embodiment, "control of output power" refers to a process in which a requested value for output power (also referred to, hereafter, as a "requested power value") of an apparatus that is included in a subsystem is identified, power that is outputted from each apparatus is determined, and a command is transmitted to an actuator that operates each apparatus such that the determined power is outputted.

The battery ECU 140 controls power storage and discharge of the battery d21. The battery ECU 140 includes the battery submanager sm2 as a functional unit. The battery submanager sm2 controls output power and input power in a subsystem that corresponds to the battery domain D2 and actualizes supply of high-voltage power, storage of regenerative power, and the like. According to the present embodiment, "control of input power" refers to a process in which a requested value for input power (also referred to, hereafter, as a "requested power value") that is inputted to a storage unit that is included in a subsystem is identified and a command is transmitted to an actuator that operates each apparatus such that energy is stored with this power.

The auxiliary apparatus ECU 150 controls operation of the auxiliary apparatuses. The auxiliary apparatus ECU 150 includes the auxiliary apparatus manager sm3 as a functional unit. The auxiliary apparatus manager sm3 controls output power and input power in a subsystem that corresponds to the auxiliary apparatus domain D3 and is composed of auxiliary apparatuses (12-volt electrical load d33).

The air-conditioning ECU 160 controls air conditioning. The air-conditioning ECU 160 includes the cooling water submanager sm4 and the air-conditioning submanager sm5 as functional units. The cooling water submanager sm4 controls output power and input power in a subsystem that corresponds to the cooling water domain D4 and actualizes heat exchange between the cooling water d42 and outside the cooling water d42, circulation of the cooling water d42, and the like. The air-conditioning submanager sm5 controls output power in a subsystem that corresponds to the air-conditioning domain D5 and actualizes air-conditioning.

The navigation apparatus 201 shown in FIG. 2 includes map information. The navigation apparatus 201 determines a candidate path based on input information on a destination that is inputted through the user interface unit 220 and information on a current location of the vehicle 10 that is acquired from the GPS apparatus 202. The navigation apparatus 201 then displays path information in a display unit (not shown) that is provided in the user interface unit 220. In addition, the navigation apparatus 201 identifies a current position along a path that is selected by a user among the path information that is displayed in the display unit, and displays the current position in the display unit. Here, the map information may be configured to be provided in an external apparatus such as a server apparatus on a cloud network, instead of the navigation apparatus 201.

In this configuration, the navigation apparatus 201 may acquire the map information by communicating with the server apparatus. The GPS apparatus 202 identifies the current position based on a signal that is outputted from a GPS satellite. Here, instead of the GPS apparatus 202, an apparatus that is capable of actualizing a global navigation satellite system (GNSS) of an arbitrary type, such as Galileo or BeiDou, may be used. The external communication unit 210 is a functional unit for communicating outside the vehicle 10.

For example, the external communication unit 210 is an antenna, an amplifier, a functional unit that performs encoding and decoding, and the like. The external communication unit 210 may be a functional unit that is capable of actualizing fourth-generation (4G) communication, fifth-generation (5G) communication, satellite communication, or the like. The user interface unit 220 includes an operating unit (not shown) such as buttons or a touch panel, and the display unit (not shown) that is a liquid crystal display or the like. The user interface unit 220 allows the user to make various types of input and outputs various types of information.

As shown in FIG. 3, when the vehicle 10 is started, or in other words, when a start button (not shown) is pressed, the submanagers sm1 to sm5 periodically transmit the "requested power value," an "actual power value," "availability," and a "stored-energy quantity" to the energy manager EM.

The "requested power value" refers to a value of total power that is requested by the subsystem (domain) that is managed by the submanager. In the domains D1 to D5, the submanagers sm1 to sm5 calculate requested power of the respective domains based on, for example, an operation state of each apparatus and user intention that is inputted through the user interface unit 220, the accelerator pedal (not shown), and the like, and acquire the requested power values.

The "requested power value" that is transmitted from each of the submanagers sm1 to sm5 to the energy manager EM according to the present embodiment is a "requested power value of power in a final usage mode." The "requested power value of power in a final usage mode" refers to a requested value of power that corresponds to a mode of energy, such as heat energy, kinetic energy, or electrical energy, that is exchanged in each domain.

For example, power that corresponds to heat energy refers to an amount of change in temperature per unit time. For example, power that corresponds to kinetic energy refers to an amount of change in acceleration (current speed) per unit time or an amount of change in position (elevation) per unit time. For example, power that corresponds to electrical energy refers to an amount of change in stored electric power per unit time.

The "actual power value" refers to a power value of power that is actually outputted or inputted in the subsystem (domain) that is managed by the submanager. This power value is calculated based on values of various sensors. For example, the actual power value of the movement domain D1 can be calculated by acceleration (deceleration) of the vehicle 10 being determined from a detection value of a vehicle speed sensor. The actual power value of the battery domain D2 can be calculated from a detection value of a current sensor. The actual power value of the auxiliary apparatus domain D3 can be calculated from a detection value of a current sensor or a detection value of an SOC sensor (not shown) that is provided in the auxiliary apparatus domain D3. The actual power value of the cooling water domain D4 can be calculated from a detection value of a temperature sensor that detects the temperature of the cooling water d42. The actual power value of the air-conditioning domain D5 can be calculated from a detection value of a temperature sensor that detects the temperature inside the cabin d51.

"Availability" refers to an amount (upper/lower limit value) that can be inputted/outputted in each domain. Availability includes "energy availability," "power availability," and "apparatus availability."

"Energy availability" refers to a limit value of an amount of energy that can be inputted/outputted in each domain. For example, in the movement domain D1, an output upper-limit value and an output lower-limit value for kinetic energy are applicable. For example, the output upper-limit value for kinetic energy is prescribed by taking into consideration safety requirements (such as a legal speed limit), component protection requirements, and the like of the vehicle 10.

In addition, for example, the output lower-limit value for kinetic energy is prescribed taking into consideration, in addition to safety requirements (such as a legal minimum speed on an expressway) and comfort requirements (such as a speed that is obtained by a predetermined value being subtracted from the legal speed limit), a difference in positional energy that is determined from a difference in elevation between the current location and the destination. Furthermore, an output upper/lower limit for cooling water can be prescribed as energy that is determined based on a difference between an upper/lower limit of an allowable range of water temperature and a current water temperature.

"Power availability" refers to a limit value of power (an amount of energy that can be inputted/outputted per unit time) that can be inputted/outputted in each domain. In the movement domain D1, power availability refers to kinetic power of the vehicle body d13. An output limit value for this kinetic power is prescribed taking into consideration safety requirements (such as excessive acceleration that compromises safety and acceleration that can be withstood by tire grip), component protection requirements, comfort requirements (such as discomfort experienced by the user as a result of excessive acceleration or deceleration), and the like. In the battery domain D2, power availability refers to chargeable power that can be charged to the battery d21 and dischargeable power that can be discharged from the battery d21. The chargeable power and the dischargeable power are mainly prescribed based on the component protection requirements. In the cooling water domain D4, power availability refers to heat absorption power of heat absorption by the cooling water d42 and heat release power of heat release from the cooling water d42. In the air-conditioning domain D5, power availability refers to heat absorbable power of heat absorption by the cabin d51 and heat releasable power of heat release from the cabin d51. For example, a limit value of heat absorbable power of the cabin d51 may be empirically determined from a speed of change in temperature that does not cause discomfort in passengers.

"Apparatus availability" refers to a limit value of input/output power in each apparatus. This limit value is set in advance for each apparatus. For example, to prevent seizing, the motor generator ECU 130 limits an output torque value of the motor generator d23 based on a detection value of a temperature sensor that detects a temperature of the motor generator d23. Therefore, a value that is obtained by this output torque value being multiplied by a rotation frequency is applicable as the apparatus availability of the motor generator d23. Here, when an applicable apparatus has malfunctioned, the availability may be set to 0 (zero).

The "stored-energy quantity" refers to an amount of stored (held) energy in each domain. In the movement domain D1, the stored-energy quantity refers to a total value of kinetic energy and positional energy that is stored in the storage unit (vehicle body d13) of the movement domain D1. In the battery domain D2, the stored-energy quantity refers to an amount of electrical energy that is stored in the battery d21 or the SOC of the battery d21. In the auxiliary apparatus domain D3, the stored-energy quantity refers to an amount of electrical energy that is stored in the 12-volt battery d32 or the SOC of the 12-volt battery d32. In the cooling water domain D4, the stored-energy quantity refers to an amount of heat energy in the cooling water d42. In the air-conditioning domain D5, the stored-energy quantity refers to an amount of heat energy in the air of the cabin d51.

When the vehicle 10 is started, as shown in FIG. 3, the energy manager EM periodically transmits an "input/output-power proposed value" and an "input/output-power limit value" to the submanagers sm1 to sm5.

According to the present embodiment, the "input/output-power proposed value" refers to a value that the energy manager EM determines as an optimal input/output power value based on a policy to "reduce an amount of consumed energy." A method for determining the input/output-power proposed value will be described hereafter. The input/output-power proposed value is merely a proposed value from the energy manager EM. Therefore, the submanagers sm1 to sm5 merely use the input/output-power proposed values as reference values and are not forced to control the apparatuses to achieve these proposed values.

The "input/output-power limit value" is used as a limit value when the submanagers sm1 to sm5 restrict the input power and the output power in the respective domains. In other words, while the each of the submanagers sm1 to sm5 can control the apparatuses that are included in the domain within a range of the input/output-power limit value, the submanager cannot control the apparatuses in the domain so as to output power or input power that exceeds the input/output-power limit value. A method for determining the input/output-power limit value will be described hereafter.

In the control system 100 that is configured as described above, input/output power can be appropriately controlled in the overall vehicle by the power and energy management process described hereafter being performed.

A2. Power and Energy Management Process

The power and energy management process shown in FIG. 4 is a process for managing input/output power and input/output energy in the domains D1 to D5. The power and energy management process is performed in the control system 100 when the vehicle 10 is started. As shown in FIG. 4, in the power and energy management process, storage planning (step S10), instantaneous power optimization (step S20), and power arbitration (step S30) are performed in this order. Here, after power arbitration, instantaneous power optimization may be performed again upon consideration of upper/lower limit constraints.

A2-1. Storage Planning

As shown in FIG. 5, storage planning (step S10) includes a subroutine that is composed of steps S105 to S145. The energy manager EM acquires future path information of the vehicle 10 (step S105). Specifically, the vehicle 10 acquires the current position of the vehicle 10 from the GPS apparatus 202 and the path information that is set from the navigation apparatus 201, and based on these pieces of information, acquires the future path information.

According to the present embodiment, the path information includes information on longitude, latitude, and gradient. The information on the gradient is used to calculate a traveling load. In addition, the information on the gradient may be used to identify elevation. Here, when the navigation apparatus 201 has not set a path, that is, when a path guidance function is not functioning or the like, a path that can be traveled by the vehicle 10 without turning left or right from the path on which the vehicle 10 is currently traveling may be set as the future path. In addition, a route that the vehicle 10 ordinarily travels may be learned. If the vehicle 10 is traveling on this route, the learned path may be set as the future path.

The energy manager EM acquires speed limit information regarding the future path that is indicated by the future path information acquired at step S105 (step S110). According to the present embodiment, the speed limit information is acquired from the map information that is provided in the navigation apparatus 201.

The energy manager EM acquires traffic congestion information regarding the future path that is indicated by the future path information acquired at step S105 (step S115). Specifically, the energy manager EM acquires the traffic congestion information from an external apparatus, such as an apparatus that manages and delivers the traffic congestion information, through the external communication unit 210. The energy manager EM uses the pieces of information acquired at steps S105 to S115 and predicts a time series (changes) of the vehicle speed of the vehicle 10 in the future (step S120).

Figure 6:
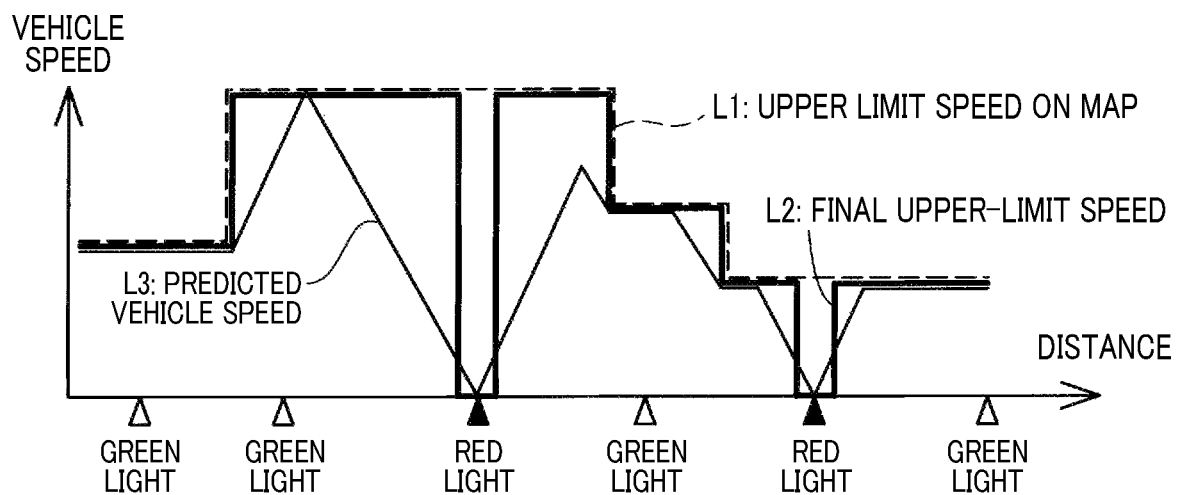
FIG. 6 is an explanatory diagram illustrating an example of a process for time-series prediction of vehicle speed.

In FIG. 6, a horizontal axis indicates a distance from the current position and a vertical axis indicates the vehicle speed of the vehicle 10. In FIG. 6, change L1 that is shown by a broken line indicates a change in an upper-limit vehicle speed on a map. In addition, in FIG. 6, change L2 that is shown by a thick solid line indicates a change in a final upper-limit vehicle speed. The "final upper-limit vehicle speed" refers to an upper limit speed that takes into consideration stopping due to a traffic light. In addition, in FIG. 6, change L3 that is shown by a thin solid line indicates a time-series prediction of the vehicle speed (predicted vehicle speed) that is acquired as a result of step S120.

The energy manager EM identifies the change L1 from the speed limit information regarding the future path that is acquired at step S110. However, the change L1 merely indicates a change in the speed limit when the traffic light is lit in a color that indicates forward advancing and no traffic congestion has occurred, and does not take into consideration when the traffic light is lit in a color that indicates stop (red in Japan) and traffic congestion has occurred. Therefore, the energy manager EM takes into consideration a case in which the traffic signal is a color that indicates stop. Specifically, the energy manager EM identifies a location (a distance from the current location) in which a traffic light is set from the map information. Then, the energy manager EM predicts traffic lights having a color that indicates stop.

For example, this prediction may be made by the traffic light being randomly determined from all traffic lights on the future path. Alternatively, cycle information on changes in the traffic light at a current time may be acquired from the traffic light and an estimation may be made based on the cycle information. In the configuration in which the traffic light is randomly determined from all traffic lights on the future path, for example, a prediction may be made that 50% of the traffic lights are traffic lights having a color that indicates stop.

In the example in FIG. 6, a case in which six traffic lights are present on the future path and two of the six traffic lights are a color (red) that indicates stop is shown. When the traffic light that is the color that indicates stop is identified in this manner, as indicated by the change L2, the vehicle speed becomes 0 (zero) at the traffic light. Then, the energy manager EM determines a predicted vehicle speed such as that indicated by the change L3 under an assumption that "the user drives so as to achieve the final upper-limit vehicle speed" and using the estimation values of acceleration and deceleration.

As shown in FIG. 5, the energy manager EM calculates a future driving power (step S125). Specifically, the energy manager EM determines driving force $F_{drv}$ based on expression (1) below and calculates driving power by multiplying the driving force $F_{drv}$ by a current vehicle speed v determined at step S120.

[Math. 1]

$$F_{drv} = F_{rl}(v) + \Delta F_{rl}(v, r) + m\frac{dv}{dt} + mg\sin\theta. \quad (1)$$

In expression (1) above, $F_{rl}(v)$ is a function of the vehicle speed v and denotes traveling resistance. $\Delta F_{rl}(v, r)$ is a function of the vehicle speed v and a curve radius r, and denotes an amount of increase in traveling resistance. A variable m denotes a total weight of the vehicle 10. A variable g denotes gravitational acceleration. A variable θ denotes a gradient of a road. Here, the amount of increase in traveling resistance may be determined by a function $\Delta F_{rl}(v, r, wv)$ of wind speed (wv) in addition to the vehicle speed v and the curve radius r.

As shown in FIG. 5, the energy manager EM acquires climate information (step S130). Specifically, through the external communication unit 210, the energy manager EM acquires information related to climate such as future weather, temperature, and the like from an external apparatus (such as a server apparatus on a cloud network) that manages and delivers climate information. Here, instead of the external apparatus, a sensor for predicting or actually measuring the climate, temperature, and the like may be set in the vehicle 10. The climate information may be determined based on a detection value of the sensor.

The energy manager EM performs prediction of future air-conditioning power using the climate information acquired at step S130 (step S135). The air-conditioning power refers to power that is required for air-conditioning. According to the present embodiment, the air-conditioning power that is used in relation to the climate information is stored in advance as a table. The energy manager EM predicts the air-conditioning power by referencing the table using the acquired climate information as a key. Here, this prediction may be made under a presumption that the air-conditioning power does not change for a predetermined amount of time.

The energy manager EM performs prediction of future auxiliary-apparatus power (step S140). The auxiliary apparatus power refers to power that is required by the auxiliary apparatuses. The energy manager EM performs the prediction using the pieces of information that are acquired from step S105 to step S135. For example, when the future path is a path that has many curves, operation frequency of the steering wheel is expected to increase. In this case, power that is required by the power steering apparatus that serves as the auxiliary apparatus is expected to increase.

In addition, for example, when a current part of day is identified as being dusk, nighttime, or dawn using the current time or a detection result of an illuminance sensor (not shown) that detects external brightness, various lighting apparatuses are expected to be lit and power required by these lighting apparatuses is expected to increase. Here, under an assumption that variable elements are not present in the future, current consumed power of the auxiliary apparatuses may be predicted as the future auxiliary-apparatus power.

The energy manager EM determines a total output power by adding the future driving power that is calculated at step S125, the future air-conditioning power that is calculated at step S135, and the future auxiliary-apparatus power that is predicted at step S140, and plans storage (energy storage amount) in each domain based on the total output power (step S145).

According to the present embodiment, based on a policy to "minimize an amount of power consumption" and with the amount of consumed energy as an objective function, a simulation is performed in advance in a modeled vehicle 10 using a mathematical optimization technique in which distribution of the total output power to the domains is optimized by various degrees of freedom, such as a charging/discharging amount of the battery d21, a charging/discharging amount of the 12-volt battery d32, a type of gear used in the transmission d11, and the rotation frequency of the motor generator d23 being variably changed.

Results of the simulation are then stored in advance in the energy manager ECU 110 as a table. Alternatively, optimization may be performed in real-time using a mathematical optimization technique based on various types of information. Then, at step S145, the energy manager EM references the table using the determined total output power as a key, identifies the distribution of power among the domains, and plans the storage in each domain. Here, the planned storage indicates an amount of storage of energy that is inputted and outputted in the domain.

For example, in the movement domain D1, the planned storage indicates a speed and a position of the vehicle body d13 that indicates a total value of kinetic energy and positional energy. In addition, for example, in the cooling water domain D4, the planned storage indicates the temperature of the cooling water d42 that indicates the heat energy that is stored in the cooling water d42.

A2-2. Instantaneous Power Optimization

Instantaneous power optimization (step S20) refers to a process for optimizing power that is inputted/outputted in each domain. Therefore, the present process is performed for each domain. However, in FIG. 7, processing content for the cooling water domain D4 is shown as an example.

Figure 7:
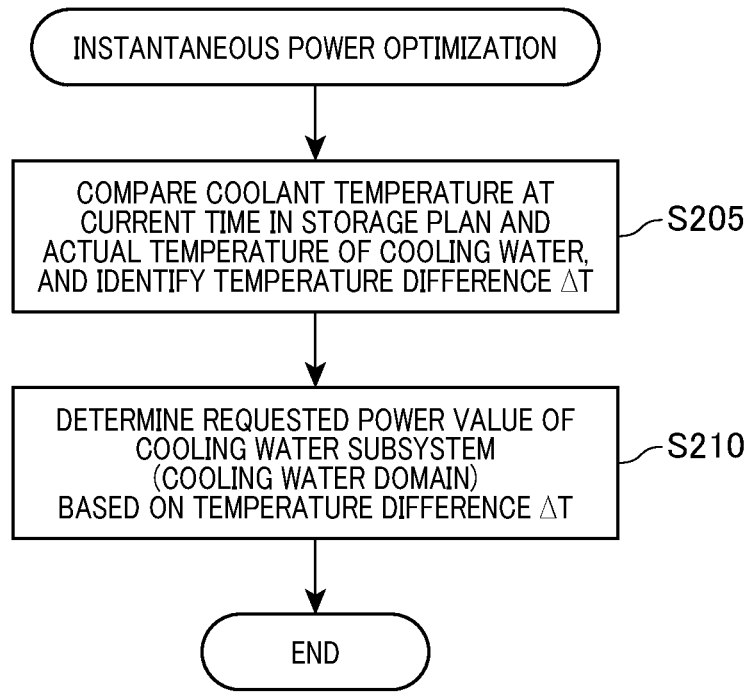
FIG. 7 is a flowchart illustrating an example of a process for instantaneous power optimization.

As shown in FIG. 7, instantaneous power optimization includes a subroutine that is composed of steps S205 to S210. The energy manager EM compares the temperature of the cooling water d42 at the current time in the storage plan that is acquired at step S145 in the above-described storage planning, that is, the plan for the amount of storage of heat energy in the cooling water domain D4 (a temperature plan for the cooling water d42) and an actual current temperature of the cooling water d42 that corresponds to the stored-energy quantity that is received from the cooling water submanager sm4, and identifies a temperature difference ΔT thereof (step S205).

The energy manager EM determines the requested power value (a power-input requested value and a power-output requested value) of the cooling water domain D4 (cooling water subsystem) based on the temperature difference ΔT that is identified at step S205 (step S210). The requested power value that is determined at step S210 can be considered to be a power value based on the storage plan that is optimal as power that is instantaneously inputted or outputted in the cooling water domain D4. However, the requested power value is merely an optimal power value in terms of the plan and is not necessarily an optimal value based on actual travel.

Instantaneous power optimization such as that shown in FIG. 7 is similarly performed not only for the cooling water domain D4, but also for the other four domains D1 to D3 and D5. That is, optimized power is determined with reference to a table that is prescribed in advance based on a difference between the energy storage amount at a current point that is derived from the storage plan of each of the domains D1 to D3 and D5, and an actual energy storage amount. However, according to the present embodiment, requested power that is obtained through instantaneous power optimization performed for the cooling water domain D4 is used as requested power that is subject to arbitration in power arbitration (step S30). Requested power that is determined for the other domains D1 to D3 and D5 is not used as requested power that is subject to arbitration. Details will be described hereafter.

A2-3. Power Arbitration

Power arbitration (step S30) refers to a process in which arbitration of input/output power is performed among domains such that appropriate input/output of power is performed in the overall vehicle 10 based on a predetermined policy. Power that can be inputted/outputted (energy that can be instantaneously outputted) in the overall vehicle 10 is referred to, according to the present embodiment, as "system availability" and is a finite value. Therefore, when a total value of requested power of the domains exceeds system availability, only power that falls below the requested value is inputted or outputted as the input/output power for at least a portion of the domains. Therefore, a process to determine how much input/output power to allow each domain is required. This process corresponds to power arbitration (step S30).

Figure 8:
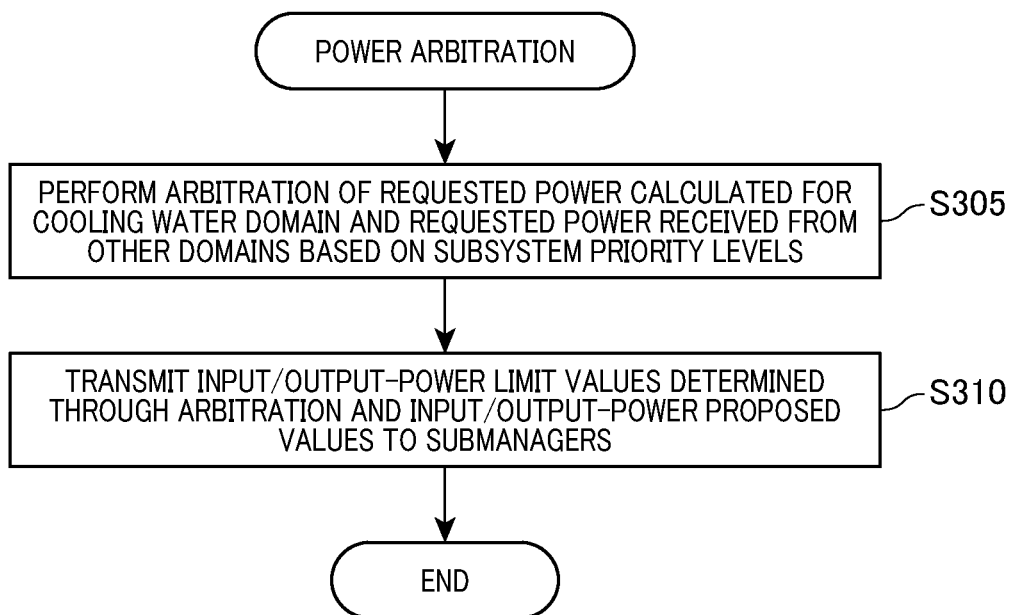
FIG. 8 is a flowchart illustrating steps in power arbitration.

As shown in FIG. 8, power arbitration includes a subroutine that is composed of steps S305 to S310. The energy manager EM performs arbitration of the requested power that is calculated at step S210 for the cooling water domain D4 (cooling water subsystem) and the requested power that is received from each of the submanagers sm1 to sm3 and sm5 of the other domains D1 to D3 and D5 (other subsystems), based on subsystem priority levels (step S305). The subsystem priority levels are priority levels for determining priority among the subsystems (domains).

According to the present embodiment, the subsystem priority levels are set in advance in a fixed manner in the energy manager ECU 110. According to the present embodiment, the priority levels are set in a following manner. Here, the setting is merely an example and other arbitrary settings are also possible.

Auxiliary apparatus domain D3>battery domain D2>movement domain D1>cooling water domain D4>air-conditioning domain D5

Figure 9:
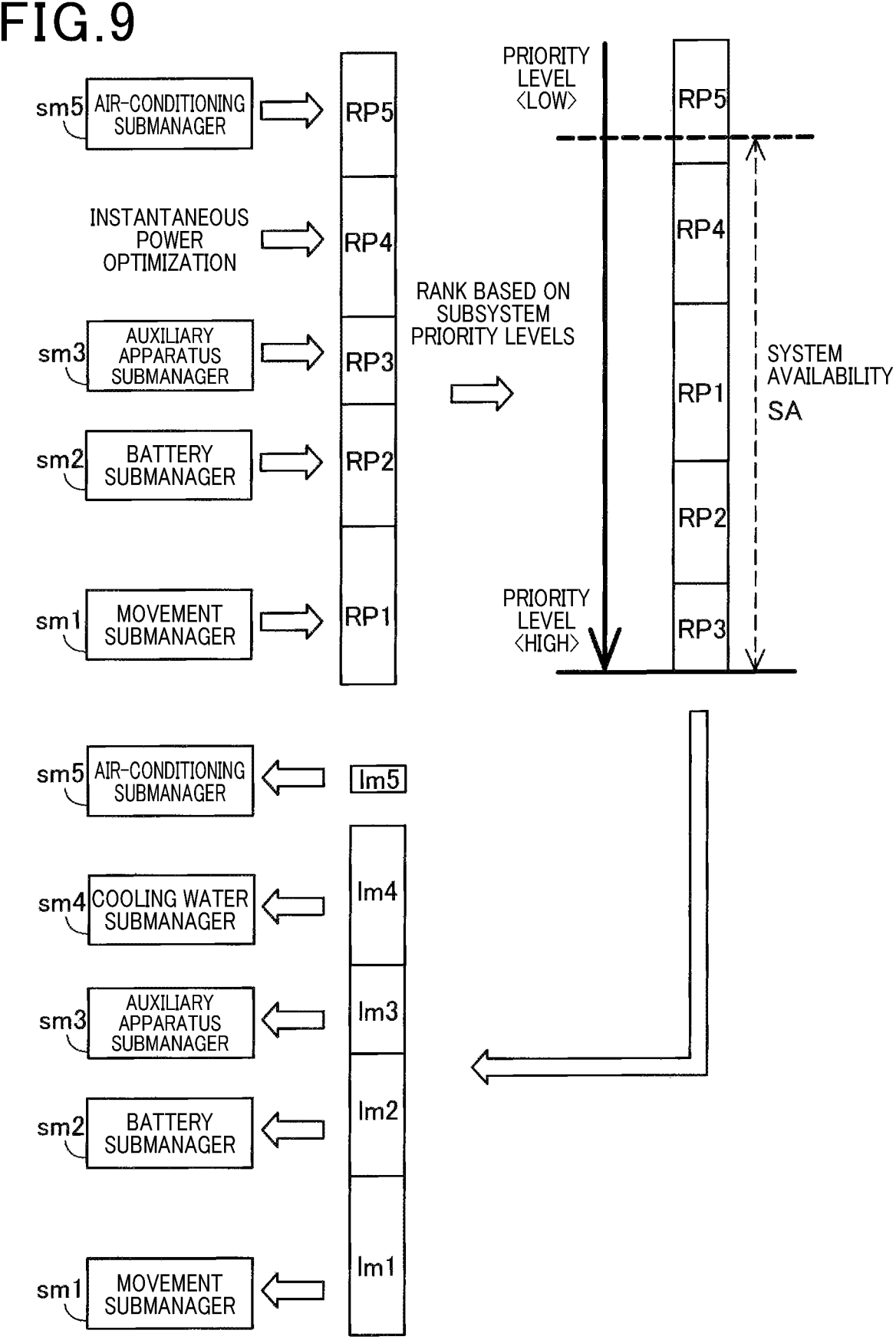
FIG. 9 is an explanatory diagram schematically illustrating a manner in which power arbitration is performed.

As shown in an upper left portion of FIG. 9, a requested power value RP1 that is received from the movement submanager sm1, a requested power value RP2 that is received from the battery submanager sm2, a requested power value RP3 that is received from the auxiliary machine manager sm3, a requested power value RP4 that is determined at step S210 of the instantaneous power optimization for the cooling water domain D4, and a requested power value RP5 that is received from the air-conditioning submanager sm5 are subject to arbitration.

The energy manager EM ranks the five requested power values RP1 to RP5 that are subject to arbitration in order of the subsystem priority levels. As a result, as shown in an upper right portion of FIG. 9, the requested power values RP1 to RP5 are ranked in order of RP3, RP2, RP1, RP4 and RP5 from a highest priority level to a lowest priority level. The energy manager EM adds the ranked requested power values in order from the requested power value that has the highest priority level. Upon reaching system availability SA, the energy manager EM excludes subsequent requested power values.

In an example in the upper right portion in FIG. 9, all of the requested power values from the requested power value RP3 that has the highest priority level to the requested power value RP4 that has the fourth highest priority level are included in the system availability SA. Meanwhile, the requested power value RP5 is partially excluded. In this manner, with reference to the system availability SA, the requested power values that are included in the system availability SA are determined as the input/output-power limit values for the domains.

Specifically, as shown in a lower left portion of FIG. 9, a value that is same as the requested power value RP1 is determined as an input/output-power limitation value lm1 of the movement domain D1. In a similar manner, a value that is same as the requested power value RP2 is determined an input/output-power limitation value lm2 of the battery domain D2. In addition, a value that is same as the requested power value RP3 is determined an input/output-power limitation value lm3 of the auxiliary apparatus domain D3.

A value that is same as the requested power value RP4 is determined an input/output-power limitation value lm4 of the cooling water domain D4. Furthermore, of the requested power value RP5, a remaining power value excluding a power value that is excluded as a result of comparison with the system availability SA is determined as an input/output-power limit value lm5 of the air-conditioning domain D5.

As shown in FIG. 8, the energy manager EM transmits the input/output-power limitation values that are determined by the arbitration at step S305 and the input/output-power proposed values to the submanagers sm1 to sm5 (step S310). According to the present embodiment, the requested power value that is determined at step S210 of instantaneous power optimization is used as the input/output-power proposed value.

When step S310 is completed, the power and energy management process is ended. The power and energy management process is performed again when a next cycle time arrives. The submanagers sm1 to sm5 that receive the input/output-power limitation values and the input/output-power proposed values at step S310 control operation of the apparatuses and storage units that are included in the respective domains using the received information.

(1-1) As a result of the control system 100 according to the first embodiment described above, the energy manager EM performs integrated control of output power in the overall vehicle 10 by exchanging information (requested power value, actual power value, availability, stored energy quantity, input/output-power proposed value, and input/output power limit value) that includes information that enables calculation of a physical quantity that is expressed by at least either of a power dimension or an energy dimension, with the plurality of submanagers sm1 to sm5. Consequently, power in the overall vehicle 10 can be appropriately controlled.

(1-2) In addition, the plurality of subsystems respectively corresponds to the plurality of domains D1 to D5 that include the storage units. Therefore, the energy manager EM can transmit information (input/output-power limit values) for integrated control of output power in the overall vehicle 10 to the submanagers sm1 to sm5, taking into consideration input and output of energy in the storage units that are included in the subsystems. Furthermore, for example, even when deficiency and excess temporarily occur in the power that is supplied to the subsystems, error between a target input/output power and an actual input/output power can be compensated through use of the storage units that are included in the subsystems.

(1-3) In addition, the information that is transmitted from the energy manager EM to the plurality of submanagers sm1 to sm5 include the requested power value, the measurement value of output power (actual power value), and the stored-energy quantity. Therefore, the energy manager EM can accurately identify a state that is related to power in each subsystem and each domain.

(1-4) Furthermore, the information that is transmitted from the energy manager EM to the plurality of submanagers sm1 to sm5 include the input/output-power proposed values and the input/output-power limit values. Therefore, the submanagers sm1 to sm5 can appropriately control the input/output power in the respective subsystems using the information that is received from the energy manager EM.

(2-1) In addition, the energy manager EM determines the input/output-power limit value of each subsystem (each domain) by performing arbitration of the requested power values that are received from the submanagers sm1 to sm5 based on the subsystem priority levels that are the priority levels of the plurality of subsystems. Therefore, the input/output power in each subsystem can be controlled within an appropriate range. As a result of appropriate control of the input/output power being continuously performed, energy that is inputted and outputted in each subsystem can be appropriately controlled. Consequently, input and output of energy in the overall vehicle 10 can be appropriately controlled.

(2-2) In addition, arbitration is performed for requested power that is calculated based on the storage plan for at least one subsystem. Therefore, under a presumption that the storage plan is appropriately set, an appropriate requested power value based on the storage plan is used in arbitration for at least the cooling water domain D4.

(3-1) Furthermore, the energy manager EM performs integrated control of output power in the overall vehicle 10 by exchanging information with the submanagers sm1 to sm5 of the plurality of subsystem that respectively corresponds to the plurality of domains D1 to D5 that each include one or more apparatuses that are mounted in the vehicle and the storage unit that inputs and outputs energy of a type that is prescribed in advance to and from the one or more apparatuses. The energy manager EM also plans the stored energy quantity of the storage unit in each of the domains D1 to D5. Consequently, even in a configuration in which a plurality of types of energy (kinetic energy, electrical energy, and heat energy) that differ from one another are inputted and outputted to and from the storage units in the domains D1 to D5, energy quantities can be planned across the plurality of types of stored energy of the storage units of the domains D1 to D5.

(3-2) In addition, the energy manager EM acquires travel-related information, such as the weather, the temperature, and the gradient, and the path information. The energy manager EM plans the stored energy quantities using the acquired information. Consequently, the stored energy quantities that are appropriate based on the traveling state, the traveling environment, and the expected traveling path of the vehicle can be planned.

(3-3) Furthermore, the energy manager EM calculates the requested power value based on the planned stored energy quantity for the subsystem of the cooling water domain D4 that is at least one subsystem among the subsystems (domains). The energy manager EM performs arbitration of the calculated requested power value and the requested power values that are received from the other subsystems, and thereby determines the input/output-power limit values that are respectively transmitted to the plurality of submanagers sm1 to sm5. Consequently, appropriate power based on the energy quantities that are planned across the plurality of types of stored energy of the storage units of the domains D1 to D5 can be inputted and outputted in the cooling water domain D4.

B. Second Embodiment

Figure 10:
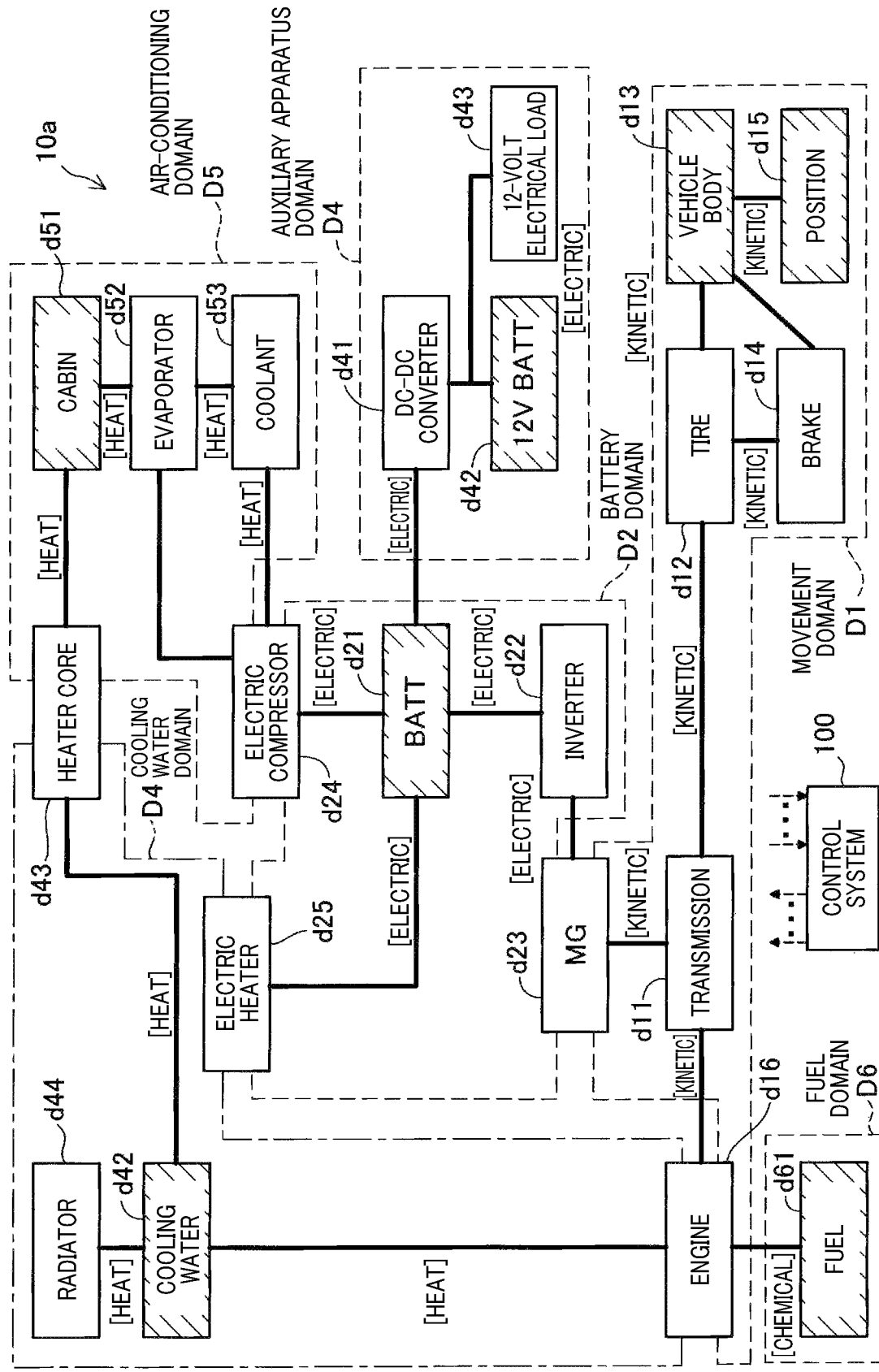
FIG. 10 is a block diagram schematically illustrating a configuration of a vehicle according to a second embodiment.

A vehicle 10a according to a second embodiment shown in FIG. 10 is configured as a hybrid vehicle. The vehicle 10a according to the second embodiment differs from the vehicle 10 according to the first embodiment shown in FIG. 1 in that a fuel domain D6 is included, an engine d16 is included in the movement domain D1, an electric heater d25 is included in the battery domain D2, the inverter d22 and the motor generator d23 are not included in the cooling water domain D4, and the chiller d41 and the heat exchanger d44 are omitted.

Other configurations of the vehicle 10a according to the second embodiment are identical to those of the vehicle 10 according to the first embodiment. Therefore, identical constituent elements are given the same reference numbers. Detailed descriptions thereof are omitted. Here, the vehicle 10a according to the second embodiment includes the same control system 100 as that of the vehicle 10 according to the first embodiment. Therefore, the power and energy management process is performed in manner similar to that according to the first embodiment.

The fuel domain D6 includes an apparatus group among which chemical energy is inputted and outputted and a storage unit. Specifically, the fuel domain D6 includes a fuel d61. Here, in addition to the fuel d61, the fuel domain D6 also includes other apparatuses (not shown) that relate to input and output of fuel, such as a fuel tank, a fuel pump, and a fuel pipe.

Here, for example, the input/output-power proposed value and the input/output-power limit value that are information that is transmitted from the energy manager EM to the fuel domain D6 (a fuel submanager sm6 described hereafter) can be used in applications such as a geofencing function (prohibition of exhaust gas in a residential area or the like). That is, when the vehicle 10a arrives in a specific area such as a residential area based on GPS, output power of the fuel domain D6 may be set to 0 (zero).

The engine d16 is driven by combustion of the fuel d61. The engine d16 is included in the cooling water domain D4 and the fuel domain D6, in addition to the movement domain D1. That is, kinetic energy is produced by the engine d16. In addition, heat energy that is generated by operation of the engine d16 is absorbed by the cooling water d42.

The electric heater d25 is operated by receiving electric power from the battery d21. The electric heater d25 provides heat to the cooling water d42. The heater core d43 uses the cooling water d42 that is heated by the engine d16 and adds heat to the cabin d51. In other words, the heater core d43 performs heat exchange between the cooling water d42 and the interior of the cabin d51.

Figure 11:
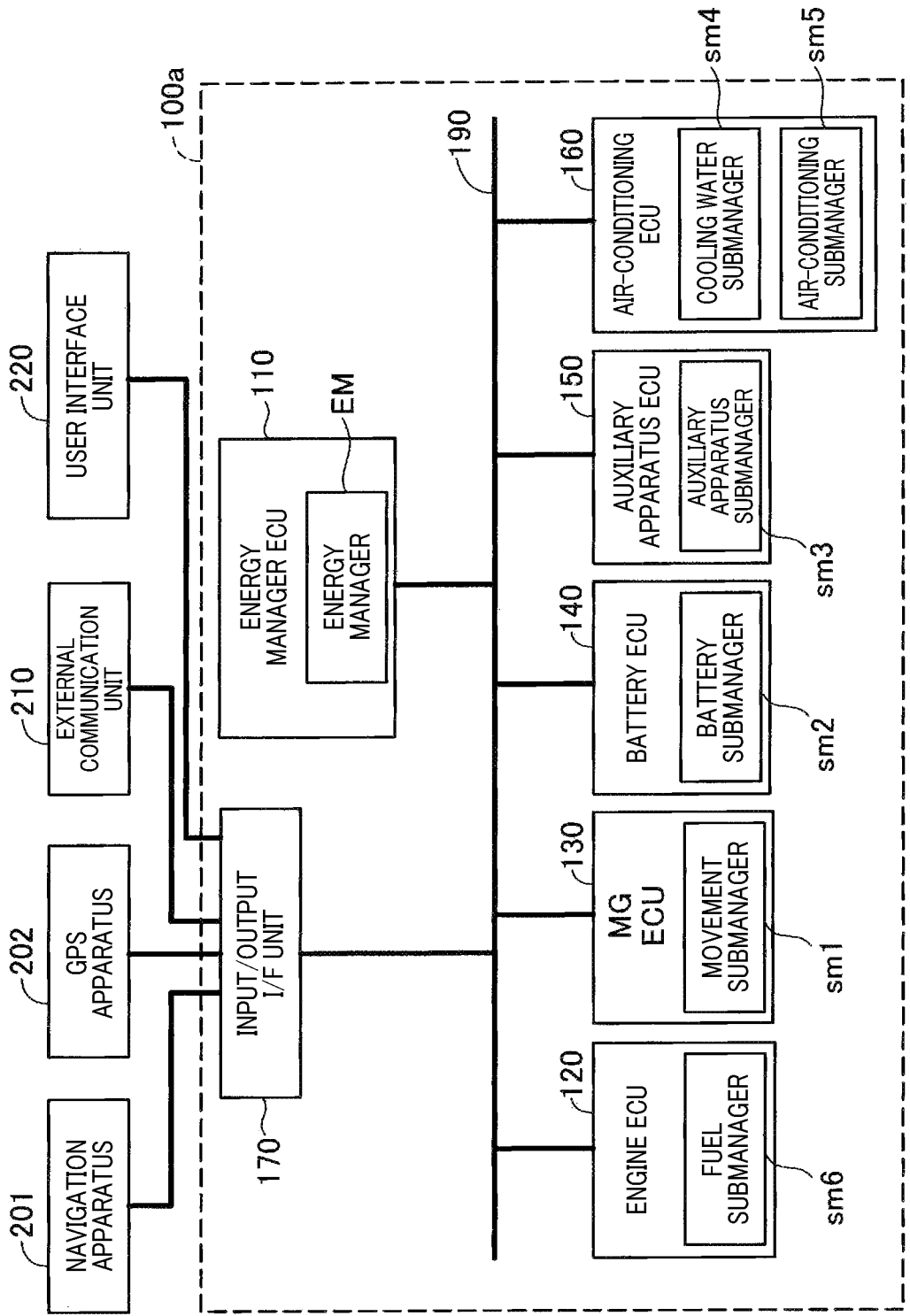
FIG. 11 is a block diagram illustrating a configuration of a control system according to the second embodiment.

As shown in FIG. 11, a control system 100a according to the second embodiment differs from the control system 100 according to the first embodiment shown in FIG. 2 in that an engine ECU 120 is provided. Other configurations are identical to those of the control system 100. The engine ECU 120 controls operation of the engine d16. The engine ECU 120 includes the fuel submanager sm6 as a functional unit. The fuel submanager sm6 corresponds to the fuel domain D6 and controls output power and input power in a fuel subsystem.

The control system 100a according to the second embodiment described above achieves effects similar to those of the control system 100 according to the first embodiment. Here, according to the second embodiment, a cooling water system that is separate from the cooling water system that uses the cooling water d42 may be provided for cooling of the inverter d22 and the motor generator d23.

C. Third Embodiment

The control system 100 according to a third embodiment differs from the control system 100 according to the first embodiment in terms of a specific method for arbitration at step S305 in power arbitration. Other configurations of the control system 100 according to the third embodiment are identical to those of the control system 100 according to the first embodiment. Therefore, identical constituent elements and identical steps are given the same reference numbers. Detailed descriptions thereof are omitted.

Figure 12:
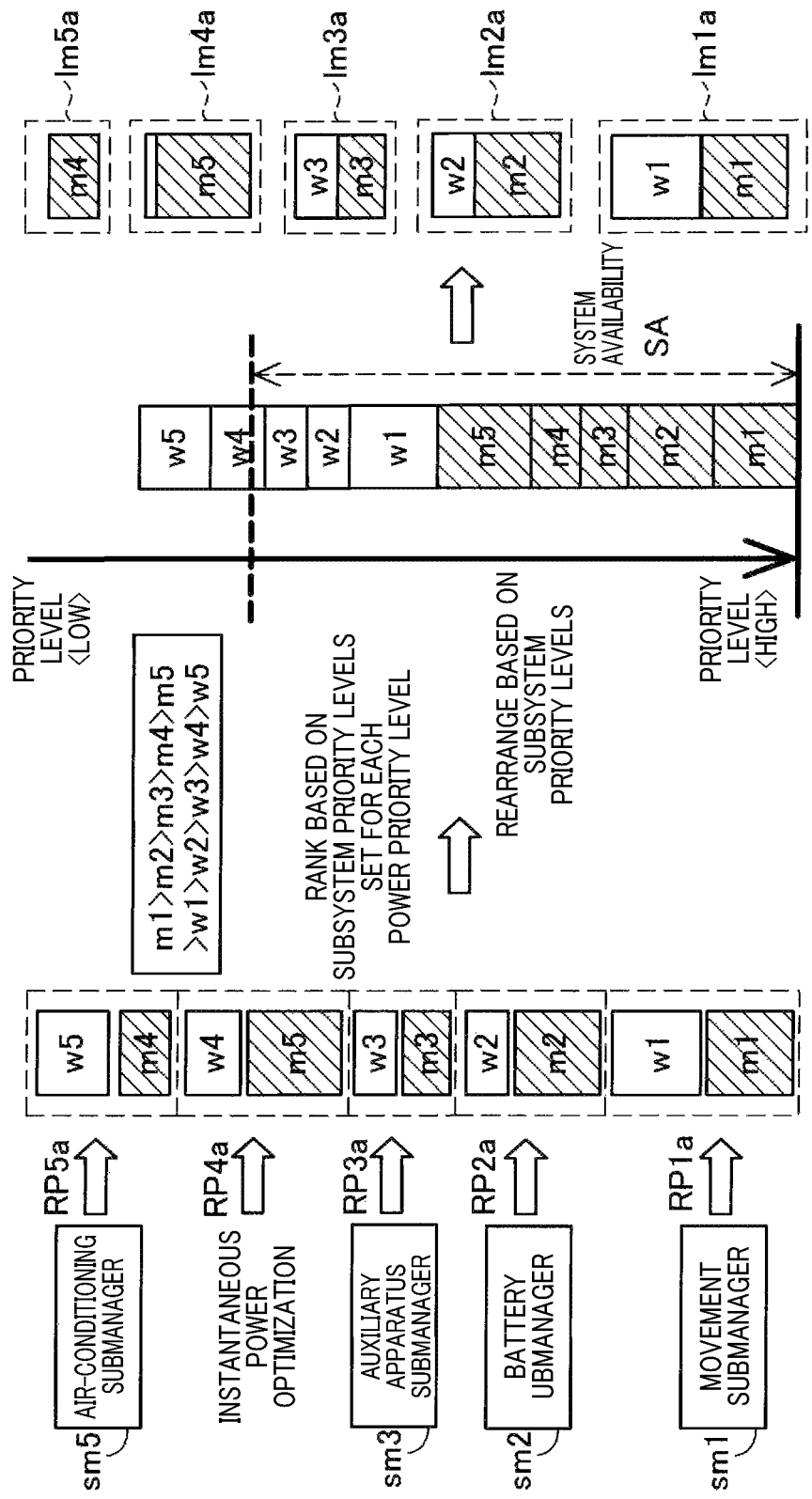
FIG. 12 is an explanatory diagram schematically illustrating a manner in which power arbitration is performed according to a third embodiment.

As shown in a left-hand portion of FIG. 12, requested power values PR1a, PR2a, PR3a, and PR5a that are received from the submanagers sm1 to sm3 and sm5 and a requested power value PR4a that is determined at step S210 of instantaneous power optimization for the cooling water domain D4 are each composed of two types (two standards) of sub-requested power values to which differing power priority levels are set.

According to the present embodiment, the sub-requested power value to which the higher power priority level is set is referred to as a first sub-requested power value and is shaded by hatching in FIG. 12. In addition, the sub-requested power value to which the lower priority level is set is referred to as a second sub-requested power value and is not shaded in FIG. 12.

According to the present embodiment, the first sub-requested power value refers to a minimum required power value (necessary input/output power: Must) of each domain. The second sub-requested power value refers to a power value that is preferably fulfilled if there is surplus (desired input/output power: Want).

The submanagers sm1 to sm5 determine the two types (two standards) of sub-requested power values that are the first sub-requested power value and the second sub-requested power value in advance. The submanagers sm1 to sm5 transmit the requested power values to the energy manager EM, together with information on the power priority levels.

According to the present embodiment, the subsystem priority levels are in advance among all domains for each power priority level. That is, the subsystem priority levels among the domains are set in advance regarding the high power priority level (first sub-requested power value). In addition, independent of the subsystem priority levels regarding the high power priority level, the subsystem priority levels among the domains are set in advance regarding the low power priority level (second sub-requested power value).

In the example in FIG. 12, the submanager sm1 transmits a first sub-requested power value m1 and a second sub-requested power value w1 to the energy manager EM as the requested power value PR1a. In a similar manner, the battery submanager sm2 transmits a first sub-requested power value m2 and a second sub-requested power value w2 to the energy manager EM as the requested power value PR2a.

In addition, the auxiliary apparatus manager sm3 transmits a first sub-requested power value m3 and a second sub-requested power value w3 to the energy manager EM as the requested power value PR3a. Furthermore, the air-conditioning submanager sm5 transmits a first sub-requested power value m4 and a second sub-requested power value w5 to the energy manager EM as the requested power value PR5a.

Here, a first sub-requested power value m5 and a second sub-requested power value w4 are determined at step S210 of instantaneous power optimization according to the present embodiment. The first sub-requested power value m5 and the second sub-requested power value w4 are used in the energy manager EM as the requested power value PR4a of the cooling water domain D4. Here, numbers "1" to "5" of the first sub-requested power values m1 to m5 indicate the subsystem priority levels regarding the high power priority level. In addition, numbers "1" to "5" of the second sub-requested power values w1 to w5 indicate the subsystem priority levels regarding the low power priority level.

The energy manager EM ranks the first sub-requested power values m1 to m5 and the second sub-requested power values w1 to w5 that are subject to arbitration based on the power priority levels and the subsystem priority levels. Rules at this time include both a rule that the sub-requested power value to which the high power priority level is set is prioritized over the sub-requested power value to which the low power priority level is set, and a rule that, among the sub-requested power values to which the same power priority level is set, the sub-requested power value to which a high subsystem priority level is set is prioritized over the sub-requested power value to which a low subsystem priority level is set.

In an example in FIG. 12, under these rules, the energy manager EM ranks the first sub-requested power value m1, the first sub-requested power value m2, the first sub-requested power value m3, the first sub-requested power value m4, the first sub-requested power value m1, and the first sub-requested power value m5, the second sub-requested power value w1, the second sub-requested power value w2, the second sub-requested power value w3, the second sub-requested power value w4, and the second sub-requested power value w5 in this order, from the highest priority level (total priority level) to the lowest priority level. Subsequently, in a manner similar to that according to the first embodiment, the energy manager EM adds the ranked requested power values in order from the requested power value that has the highest priority level.

Upon reaching the system availability SA, the energy manager EM excludes subsequent requested power values. As a result, in the example in FIG. 12, a portion of the second sub-requested power value w4 and the entirety of the second sub-requested power value w5 are excluded. The energy manager EM transmits a value that is obtained by adding the first sub-requested power value m1 and the second sub-requested power value w1 to the movement submanager sm1 as an input/output-power limit value lm1a of the movement domain D1.

In addition, the energy manager EM transmits a value that is obtained by adding the first sub-requested power value m2 and the second sub-requested power value w2 to the battery submanager sm2 as an input/output-power limit value lm2a of the battery domain D2. In addition, the energy manager EM transmits a value that is obtained by adding the first sub-requested power value m3 and the second sub-requested power value w3 to the auxiliary apparatus submanager sm3 as an input/output-power limit value lm3a of the auxiliary apparatus domain D3.

Furthermore, the energy manager EM transmits the first sub-requested power value m5 and a portion of the second sub-requested power value w4 to the cooling water submanager sm4 as an input/output-power limit value lm4a. Moreover, the energy manager EM transmits the first sub-requested power value m4 to the air-conditioning submanager sm5 as an input/output-power limit value lm5a of the air-conditioning domain D5.

In this manner, according to the third embodiment, when the system availability SA is a value that is greater than the first sub-requested power values m1 to m5, at least the first sub-requested power values m1 to m5 can be transmitted as the input/output-power limit values of the domains D1 to D5. Therefore, the minimum required power value (necessary input/output power: Must) of each domain can be inputted/outputted.

The control system 100 according to the third embodiment described above achieves effects similar to those of the control system 100 according to the first embodiment.

(2-4) In addition, the energy manager EM subjects the first and second sub-requested power values that are received from the plurality of submanagers sm1 to sm3 and sm5, and the first and second sub-requested power values that are acquired by instantaneous power optimization based on the storage plan for the cooling water domain D4 to arbitration. Therefore, compared to a configuration in which the requested power values that are received from the submanagers sm1 to sm3 and sm5 and the requested power value that is determined through instantaneous power optimization based on the storage plan for the cooling water domain D4 are respectively arbitrated as single values, the required power for each subsystem can be arbitrated with more accuracy.

(2-5) Furthermore, independent subsystem priority levels are respectively set for the plurality of first sub-requested power values of the plurality of subsystems (domains) and the plurality of second sub-requested power values of the plurality of subsystems (domains). Therefore, an order of priority among the subsystems can be set for the sub-requested power values (the first sub-requested power values and the second sub-requested power values) based on the power priority levels.

Consequently, finer adjustment of power (sub-requested power) can be actualized in which, for example, the priority level of a certain subsystem is arbitrated to be the highest regarding power (sub-requested power) that has a high priority level, and regarding power (sub-required power) that has a low priority level, the priority level of another subsystem is adjusted to be the highest.

(2-6) In addition, of the first sub-requested power value and the second sub-requested power value, the first sub-requested power value is the minimum required power value in the subsystem. Therefore, adjustment can be made based on the priority levels among subsystems for at least the minimum required power values. In addition, the minimum required power values are set to a higher power priority level. Therefore, the minimum required power can be preferentially arbitrated in each subsystem (domain).

D. Fourth Embodiment

Figure 13:
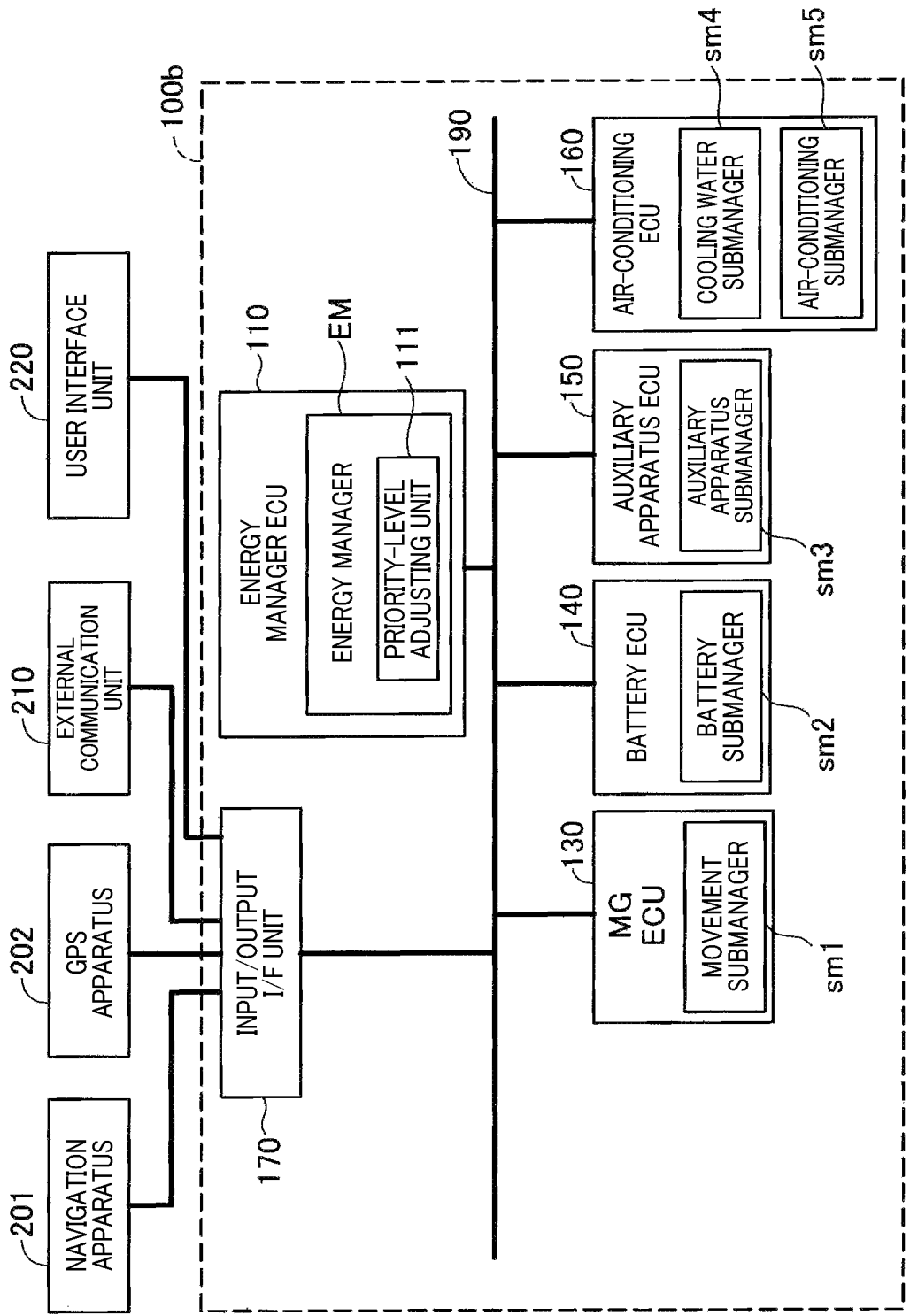
FIG. 13 is a block diagram illustrating a configuration of a control system according to a fourth embodiment.

A control system 100b according to a fourth embodiment shown in FIG. 13 differs from the control system 100 according to the first embodiment shown in FIG. 2 in that the energy manager EM includes a priority level adjusting unit 111, the subsystem priority levels are variable rather than being fixed values, and the subsystem priority levels are set (adjusted) based on a command from an external apparatus. Other configurations of the control system 100b according to the fourth embodiment are identical to those of the control system 100 according to the first embodiment. Therefore, identical constituent elements are given the same reference numbers. Detailed descriptions thereof are omitted.

The priority level adjusting unit 11 shown in FIG. 13 sets the subsystem priority levels. The priority level adjusting unit 111 adjusts (sets) the subsystem priority levels based on a command from an external communication apparatus that is inputted through the input/output interface unit 170 and the external communication unit 210.

Figures 14, 15:
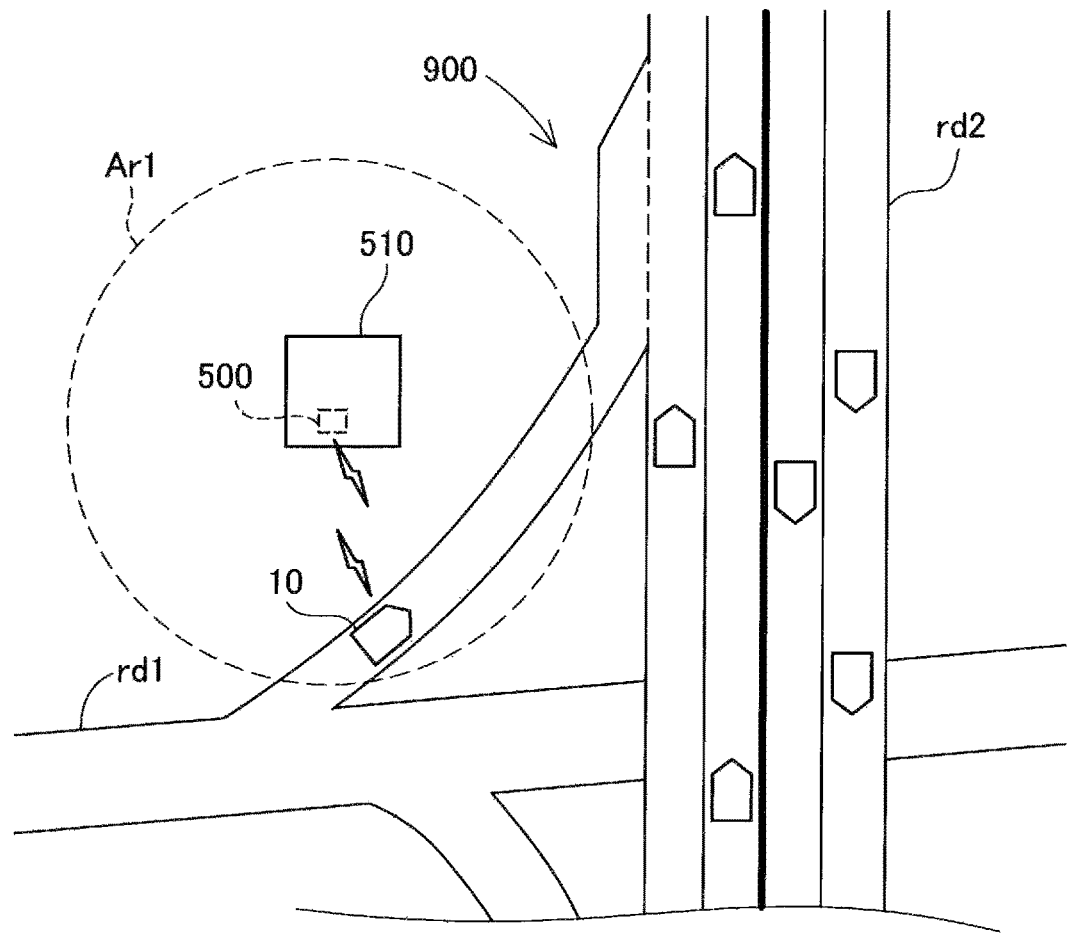
FIG. 14 is an explanatory diagram illustrating an example of a situation in which subsystem priority levels are changed according to the fourth embodiment.
FIG. 15 is an explanatory diagram illustrating an example of an apparatus list before system renewal according to a fifth embodiment.

For example, as shown in FIG. 14, the subsystem priority levels may be set (adjusted) while the vehicle 10 that had been traveling on a local road rd1 is traveling on an interchange 900 to enter an expressway rd2. Specifically, an apparatus 500 (referred to, hereafter, as a "priority-level adjustment command apparatus 500") that commands changes to the subsystem priority levels is arranged inside a building 510 that is set near the interchange 900 at a distance over which wireless communication can be performed with the vehicle 10 that is traveling on the interchange 900.

When the apparatus 500 identifies that the vehicle 10 has an area Ar1 within a predetermined distance range from the apparatus 500 based on a reception signal strength of a wireless signal or the like, the apparatus 500 transmits predetermined subsystem priority levels to the vehicle 10. Then, in the control system 100, the priority level adjusting unit 111 sets the received subsystem priority levels as the subsystem priority levels to be used for arbitration. As the subsystem priority levels to be set at this time, because the vehicle 10 is required to be sufficiently accelerated to enter the expressway rd2, the subsystem priority levels may be set such that the subsystem priority level of the movement domain D1 is higher.

Meanwhile, while the vehicle 10 is traveling on the local road rd1, for example, the subsystem priority levels may be set such that the subsystem priority level of the air-conditioning domain D5 is higher, with an intention to improve comfort experienced by the user regarding temperature. Here, the apparatus 500 may notify the control system 100 that the vehicle 10 is currently traveling on the interchange 900. In the control system 100 that receives the notification, the energy manager EM may determine that the subsystem priority levels are to be changed.

Here, according to the present embodiment, the input/output interface unit 170 corresponds to an "input interface" of the present disclosure.

The control system 100b according to the fourth embodiment described above achieves effects similar to those of the control system 100 according to the first embodiment.

(2-7) In addition, because the subsystem priority levels are not fixed values and can be adjusted, the subsystem priority levels can be set based on changes in a state, a traveling environment, and the like of the vehicle 10, such as the traveling environment of the vehicle 10 including the weather, outdoor temperature, elevation, and the like, a time of day of traveling, and a total traveled distance. Control of input and output of energy in the overall vehicle 10 can be appropriately performed based on the changes in the state, the traveling environment, and the like of the vehicle 10.

(2-8) Furthermore, the priority level adjusting unit 111 adjusts the subsystem priority levels that are set for the plurality of subsystems (domains) to the subsystem priority levels that are inputted from the external communication unit 210 through the input/output interface unit 170. Therefore, as a result of appropriate priority levels being inputted from the input/output interface unit 170 (according to the present embodiment, more accurately the priority level adjustment instruction apparatus 500), control of input and output of energy in the overall vehicle 10 can be appropriately performed based on changes in the state, the traveling environment, and the like of the vehicle 10.

(2-9) In addition, because the input interface includes a communication interface, the appropriate priority levels can be inputted from outside the control system 100b.

E. Fifth Embodiment

The control system 100 according to the fifth embodiment has a configuration that is identical to that of the control system 100 according to the first embodiment. Therefore, identical constituent elements are given the same reference numbers. Detailed descriptions thereof are omitted.

Tables that are used for storage planning (step S10), instantaneous power optimization (step S20), and power arbitration (step S30) performed by the energy manager EM may be significantly changed depending on types and capabilities of the apparatuses and storage units that are included in the domain. Here, in the control system 100 according to the fifth embodiment, when the apparatuses and the storage units are renewed, and further, when the subsystems (domains) themselves are increased or decreased, information related to these apparatuses and storage units are rewritten.

Figure 16:
FIG. 16 is an explanatory diagram illustrating an example of the apparatus list after system renewal according to the fifth embodiment.

The energy manager EM according to the fifth embodiment has, in advance, an apparatus list Ls1 shown in FIG. 15 and FIG. 16, and information (such as efficiency and maximum output) on each apparatus that is listed in the apparatus list Ls1. The apparatus list Ls1 is a list in which the apparatuses and subsystems that can be mounted in the vehicle 10 and information regarding whether the apparatuses and subsystems are actually mounted in the vehicle 10 are recorded.

In an example in FIG. 15, an electric heater 2 is recorded as an apparatus that is not mounted in the vehicle 10. However, when the electric heater 2 is added to the vehicle 10, as shown in FIG. 16, a present/absent flag for the electric heater 2 is changed to 1 that indicates "present." Therefore, the energy manager EM can perform instantaneous power optimization and the like taking into consideration the presence of the electric heater 2.

In addition, as a variation example according to the fifth embodiment, the energy manager EM may include an apparatus list Ls3 shown in FIG. 17. In the apparatus list Ls3, in addition to the capabilities (such as efficiency, maximum output, and minimum output) of the apparatuses, information regarding the domain from which energy is received (IN) and the domain to which energy is provided (OUT), among the domains D1 to D5, is recorded. Here, the capabilities of the apparatuses may be recorded using scalar values.

Alternatively, a map may be separately recorded and information that allows identification of the map may be recorded. This apparatus list Ls3 may record therein a list of all types of apparatuses that can be expected to be mounted in the vehicle 10 in advance. Addition, deletion, and changes regarding applicable apparatuses may be performed by the information that indicates "IN" and the information that indicates "OUT" being added, deleted, or changed.

Here, when the apparatuses and subsystems are renewed, the submanagers sm1 to sm5 may notify the energy manager EM with information regarding the types and capabilities (such as efficiency, maximum output, and minimum output) of the renewed apparatuses and subsystems. In addition, the information to be notified may include at least a portion of the type, maximum input power, and maximum output power of the apparatuses and the subsystems.

F. Other Embodiments (F1) According to the first embodiment, the subsystem priority levels are set in a fixed manner. Depending on a magnitude of the system availability SA, a value that is smaller than the requested power value may be set as the input/output-power limit value at all times regarding a domain that has a low priority level. Limitation may be applied to the input/output power at all times for this domain.

Therefore, for example, as in the requested power value RP5 in FIG. 9, when the input/output power limit value lm5 is set such that a portion thereof is excluded, the power value that is limited, that is, a difference between the requested power value and the input/output-power limit value may be integrated and the subsystem priority levels may be changed based on the integrated value.

For example, when the integrated value exceeds a threshold, a process such as the subsystem priority level being raised by one or the subsystem priority level being set to the highest level may be performed. Here, the subsystem priority levels may be adjusted based on an arbitrary type of statistical value of the difference, such as an average value of the difference or a maximum value of the difference within a predetermined amount of time, instead of the integrated value of the difference.

(2-11) As a result of this configuration, the subsystem priority levels are adjusted based on the statistical value of the difference between the requested power value that is received from each submanager and the input/output-power limit value that is transmitted to each submanager. Consequently, a certain subsystem continuously receiving excessive or insufficient supply of power as a result of arbitration based on the priority levels can be suppressed.

(F2) According to the embodiments, mapping of the energy manager EM, the submanagers sm1 to sm5, and the ECUs 110 to 160 can be arbitrarily performed. For example, the configuration may be such that the energy manager ECU 110 is omitted, and the motor generator ECU 130 includes the energy manager EM as a functional unit. In addition, for example, the configuration may be such that a cooling water ECU is newly provided, and the cooling water ECU includes the cooling water submanager sm4 as a functional unit.

(F3) According to the embodiments, instead of the actual power value that is transmitted from each of the submanagers sm1 to sm5 to the energy manager EM, or in addition to the actual power value, a current power estimation value may be transmitted. For example, in a configuration in which a sensor that is capable of directly measuring actual power is not provided, a detection value of a sensor that detects a value that enables calculation of the actual power may be used to calculate (estimate) the actual power, and the estimation value may be transmitted to the energy manager EM.

(F4) According to the embodiments, as the information that is transmitted from each of the submanagers sm1 to sm5 to the energy managers EM, an energy quantity of an amount of energy that can be further stored in the storage unit of each of the domains D1 to D5 may be transmitted to the energy manager EM. The "energy quantity that can be further stored" refers to a difference value of a difference between a storable-limit energy quantity of the storage unit and a current energy storage amount. Here, the above-described stored-energy quantity corresponds to an "energy quantity that can be further discharged."

(F5) According to the fourth embodiment, the subsystem priority levels can be adjusted. However, this may be applied to the power priority levels according to the third embodiment. That is, according to the third embodiment, the configuration may be such that, instead of the subsystem priority levels, or in addition to the subsystem priority levels, the power priority levels can be adjusted. In this configuration as well, effects similar to those according to the third and fourth embodiments are achieved.

(F6) According to the fourth embodiment, the subsystem priority levels are adjusted based on a command that is inputted from the priority-level adjustment command apparatus 500 through the input/output interface unit 170 and the external communication unit 210. However, the present disclosure is not limited thereto. The subsystem priority levels may be adjusted based on a command regarding the subsystem priority levels that are inputted by the user through the user interface unit 220. As a result of this configuration, the user can input the appropriate priority levels using the user interface unit 220.

(F7) According to the embodiments, the subsystems correspond to the domains D1 to D5, one-to-one. However, the present disclosure is not limited thereto. For example, the cooling water domain D4 and the air-conditioning domain D5 may be considered to be a single subsystem.

(F8) According to the embodiments, the information that is transmitted from the energy manager EM to each of the submanagers sm1 to sm5 is the input/output-power proposed value and the input/output-power limit value. However, the input/output-power proposed value may be omitted.

(F9) According to the embodiments, regarding the cooling water domain D4, unlike the other domains D1 to D3 and D5, the requested power that is acquired as a result of instantaneous power optimization is used for arbitration. However, the present disclosure is not limited thereto. The configuration may be such that the requested power that is acquired as a result of instantaneous power optimization is used for arbitration regarding at least a portion of the other domains D1 to D3 and D5, instead of the cooling water domain D4 or in addition to the cooling water domain D4. In addition, conversely, the configuration may be such that the requested power values that are received from the submanagers sm1 to sm5 are used for arbitration regarding all of the domains D1 to D5.

(F10) According to the embodiments, the subsystem priority levels are set in the energy manager EM. However, the subsystem priority levels may be set in the submanagers sm1 to sm5. In this configuration, the submanagers sm1 to sm5 may transmit information indicating the subsystem priority levels to the energy manager EM, together with the requested power values.

(F11) According to the third embodiment, the submanagers sm1 to sm5 transmit information on the power priority levels, together with the first sub-requested power values and the second sub-requested power values. However, the present disclosure is not limited thereto. For example, each of the submanagers sm1 to sm5 may transmit, to the energy manager EM, a total power value of the first sub-requested power value and the second sub-requested power value, and information that indicates proportions of the first sub-requested power value and the second sub-requested power value in the total power value.

In this configuration as well, the energy manager EM can identify the first sub-requested power value and the second sub-requested power value of each of the domains D1 to D5. In this configuration, the "information that indicates proportions of the first sub-requested power value and the second sub-requested power value" can also be referred to as information (division information) for dividing the requested power value into a plurality of sub-requested power values to which differing power priority levels are set. In this configuration as well, effects similar to those according to the third embodiment are achieved.

(F12) The ECUs 110 to 160 and the methods thereof described in the present disclosure may be actualized by a dedicated computer that is provided so as to be configured by a processor and a memory, the processor being programmed to provide one or a plurality of functions that are realized by a computer program.

Alternatively, the ECUs 110 to 160 and the methods thereof described in the present disclosure may be actualized by a dedicated computer that is provided by a processor being configured by a single dedicated hardware logic circuit or more. As another alternative, the ECUs 110 to 160 and the methods thereof described in the present disclosure may be actualized by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory tangible recording medium that can be read by a computer as instructions performed by the computer.

The present disclosure is not limited to the above-described embodiments and can be actualized through various configurations without departing from the spirit of the disclosure. For example, technical features according to embodiments that correspond to technical features in each aspect described in the summary of the disclosure can be replaced and combined as appropriate to solve some or all of the above-described issued or to achieve some or all of the above-described effects. Furthermore, the technical features may be omitted as appropriate unless described as a requisite in the present specification.

What is claimed is:

1. A control system that controls power supply in a vehicle, the control system comprising:
   a plurality of sub-power managers that control respective output power of a plurality of subsystems that actualize functions of the vehicle; and
   an integrated power manager that performs integrated control of output power in the overall vehicle by exchanging information with the plurality of sub-power managers, wherein:
   the information that is exchanged between the plurality of sub-power managers and the integrated power manager includes information that enables calculation of a physical quantity that is expressed by at least either of a power dimension and an energy dimension;
   the plurality of subsystems respectively corresponds to a plurality of domains that each include one or more apparatuses that are mounted in the vehicle and a storage unit that performs input and output of a type of energy that is prescribed in advance to and from the one or more apparatuses;
   the integrated power manager plans a stored energy quantity of the storage unit in each of the domains that respectively correspond to the plurality of sub-power managers; and
   the integrated power manager acquires at least either of travel-related information that is related to a traveling state and a traveling environment of the vehicle and path information that indicates an expected traveling path of the vehicle, and plans the stored energy quantities using the acquired information.

2. The control system according to claim 1, wherein:
   information that is transmitted from the plurality of sub-power managers to the integrated power manager includes at least a portion of
     a requested power value of a subsystem,
     a measurement value or an estimation value of output power in the subsystem;
     a stored-energy quantity of energy that is stored in the storage unit, and
     a storable/dischargeable-energy quantity of energy that can be further stored or discharged in the storage unit,
   information that is transmitted from the integrated power manager to each of the plurality of sub-power managers includes at least an input/output-power limit value of the subsystem, and
   the integrated power manager
     calculates the requested power value based on the planned stored energy quantity for at least one subsystem among the subsystems, and
     determines the input/output-power limit value that is transmitted to each of the plurality of sub-power managers by performing arbitration of the requested power value that is calculated for the at least one subsystem and the requested power values that are received from the subsystems other than the at least one subsystem.

3. The control system according to claim 2, wherein:
   information that is transmitted from the plurality of sub-power managers to the integrated power manager includes a requested power value of the subsystem, and
   the requested power value is a power value of a type that corresponds to the type of energy that is exchanged in a domain that corresponds to a sub-power manager.

4. The control system according to claim 3, wherein:
   the plurality of sub-power managers each notify the integrated power manager of at least a portion of information among an apparatus type, a maximum input power, and a maximum output power of the one or more apparatuses and the storage unit that are included in a domain that corresponds to the subsystem, in a state in which initial communication with the integrated power manager becomes possible.

5. The control system according to claim 1, wherein:
   information that is transmitted from the plurality of sub-power managers to the integrated power manager includes a requested power value of the subsystem, and
   the requested power value is a power value of a type that corresponds to the type of energy that is exchanged in a domain that corresponds to a sub-power manager.

6. The control system according to claim 1, wherein:
   the plurality of sub-power managers each notify the integrated power manager of at least a portion of information among an apparatus type, a maximum input power, and a maximum output power of the one or more apparatuses and the storage unit that are included in a domain that corresponds to a subsystem, in a state in which initial communication with the integrated power manager becomes possible.

7. The control system according to claim 2, wherein:
the plurality of sub-power managers each notify the integrated power manager of at least a portion of information among an apparatus type, a maximum input power, and a maximum output power of the one or more apparatuses and the storage unit that are included in a domain that corresponds to the subsystem, in a state in which initial communication with the integrated power manager becomes possible.

8. The control system according to claim 5, wherein:
the plurality of sub-power managers each notify the integrated power manager of at least a portion of information among an apparatus type, a maximum input power, and a maximum output power of the one or more apparatuses and the storage unit that are included in a domain that corresponds to the subsystem, in a state in which initial communication with the integrated power manager becomes possible.

* * * * *